United States Patent
Kim et al.

(10) Patent No.: US 9,345,114 B2
(45) Date of Patent: May 17, 2016

(54) LIGHTING SYSTEM AND SIGNAL CONVERTING DEVICE THEREFOR

(71) Applicant: SAMSUNG ELECTRONICS CO., LTD., Suwon-Si, Gyeonggi-do (KR)

(72) Inventors: Chang Seob Kim, Seoul (KR); Min Su Kim, Ansan-Si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 100 days.

(21) Appl. No.: 14/460,313

(22) Filed: Aug. 14, 2014

(65) Prior Publication Data

US 2015/0130365 A1 May 14, 2015

(30) Foreign Application Priority Data

Nov. 14, 2013 (KR) .......................... 10-2013-0138542

(51) Int. Cl.
*H05B 37/02* (2006.01)
*H05B 33/08* (2006.01)

(52) U.S. Cl.
CPC ........ *H05B 37/0272* (2013.01); *H05B 33/0872* (2013.01); *H05B 37/0254* (2013.01)

(58) Field of Classification Search
CPC ............... H05B 37/02; H05B 37/0254; H05B 37/0272; H05B 33/08; H05B 33/0872; H04L 29/08; H04L 29/12; H04L 61/2038
USPC .................. 315/291, 307, 308, 312
See application file for complete search history.

(56) References Cited

U.S. PATENT DOCUMENTS

| | | |
|---|---|---|
| 6,372,608 B1 | 4/2002 | Shimoda et al. |
| 6,645,830 B2 | 11/2003 | Shimoda et al. |
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |

(Continued)

FOREIGN PATENT DOCUMENTS

| | | |
|---|---|---|
| JP | 2012-015076 A | 1/2012 |
| KR | 10-1161079 B1 | 6/2012 |
| KR | 10-1290747 B1 | 7/2013 |

*Primary Examiner* — Jimmy Vu
(74) *Attorney, Agent, or Firm* — McDermott Will & Emery LLP

(57) ABSTRACT

A lighting system includes a digital addressable lighting interface (DALI) master controller, a lighting driver, and a signal converter. The DALI master controller is connected to a management server. The lighting driver operates a lighting device including a light emitting diode (LED). The signal converter is connected to the DALI master controller by a DALI bus operating according to a DALI communication protocol, and is communicatively connected to the lighting driver via a wireless communication connection operating according to a wireless communication protocol. The signal converter inter-converts a signal transmitted and received from the DALI master controller according to the DALI communication protocol and a signal transmitted to and received from the lighting driver according to the wireless communication protocol so as to enable communication between the lighting driver and the DALI master controller.

19 Claims, 21 Drawing Sheets

(56) References Cited

U.S. PATENT DOCUMENTS

| | | |
|---|---|---|
| 7,288,758 B2 | 10/2007 | Sherrer et al. |
| 7,319,044 B2 | 1/2008 | Han et al. |
| 7,417,556 B2 | 8/2008 | Ling |
| 7,446,671 B2 | 11/2008 | Giannopoulos et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,111,008 B2 | 2/2012 | Veskovic et al. |
| 8,125,315 B2 | 2/2012 | Veskovic et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 2006/0044152 A1 | 3/2006 | Wang |
| 2011/0140611 A1 | 6/2011 | Elek et al. |
| 2012/0212140 A1 | 8/2012 | Kim et al. |
| 2013/0119894 A1 | 5/2013 | Yeh et al. |
| 2015/0084547 A1* | 3/2015 | Yeh .................. H04L 12/2807 315/312 |

\* cited by examiner

| CHANNEL INFORMATION (CH) | WIRELESS NETWORK ID INFORMATION (PAN_ID) | DEVICE ADDRESS (Ded_ADD) | SENSING DATA (ILLUMINATION INTENSITY VALUE, MOTION VALUE) |

LIGHTING SYSTEM AND SIGNAL CONVERTING DEVICE THEREFOR

CROSS-REFERENCE TO RELATED APPLICATION

This application claims the benefit of Korean Patent Application No. 10-2013-0138542 filed on Nov. 14, 2013, with the Korean Intellectual Property Office, the disclosure of which is incorporated herein by reference.

BACKGROUND

The present disclosure relates to a lighting system and a signal converting device therefor.

Light emitting diodes (LEDs) are commonly used as light sources due to various advantages such as low power consumption, high luminance, and the like. In particular, recently, light emitting devices have been employed as backlights in lighting devices and large liquid crystal displays (LCDs). In many cases, light emitting devices are provided in the form of a package so as to be easily installed in various devices such as lighting fixtures, devices, or the like. As LEDs are being increasingly used for illumination purposes, a lighting system using a digital addressable lighting interface (DALI) protocol has been proposed as a way to collectively controlling a plurality of lighting devices.

SUMMARY

An aspect of the present disclosure may provide a lighting system capable of collectively controlling a plurality of lighting devices wirelessly.

According to an aspect of the present disclosure, a lighting system may include a digital addressable lighting interface (DALI) master controller, a lighting driver, and a signal converter. The DALI master controller is connected to a management server. The lighting driver operates a lighting device including a light emitting diode (LED). The signal converter is connected to the DALI master controller by a DALI bus operating according to a DALI communication protocol and is communicatively connected to the lighting driver via a wireless communication connection operating according to a wireless communication protocol. The signal converter inter-converts a signal transmitted to and received from the DALI master controller according to the DALI communication protocol and a signal transmitted to and received from the lighting driver according to the wireless communication protocol so as to enable communication between the lighting driver and the DALI master controller.

The DALI master controller may generate a first signal including information transmitted from the management server and conforming to the DALI communication protocol, and the signal converter may receive the first signal conforming to the DALI communication protocol, convert the first signal into a second signal conforming to the wireless communication protocol, and transmit the converted second signal to the lighting driver.

The lighting driver may generate a second signal including operation information of the lighting device and conforming to the wireless communication protocol, and the signal converter may receive the second signal conforming to the wireless communication protocol, convert the second signal into a first signal conforming to the DALI communication protocol, and transmit the converted first signal to the DALI master controller.

The lighting driver may include a plurality of lighting drivers, the lighting device may include a plurality of lighting devices, and each of the plurality of lighting drivers may control operation of at least one of the plurality of lighting devices.

At least one of the plurality of lighting drivers may be integrated in a single module with the signal converter.

The at least one lighting driver integrated in a single module with the signal converter may be communicatively connected to at least one other lighting driver and configured to perform communication according to the wireless communication protocol with the at least one other lighting driver.

The signal converter may communicate independently with each of the plurality of lighting drivers by using unique addresses allotted to each of the plurality of lighting drivers.

The lighting driver may include a wireless communications module configured to receive from the signal converter a signal conforming to the wireless communication protocol, and driving circuitry configured to control operation of the lighting device based on information included in the signal received from the signal converter.

The driving circuitry may control an operation of the lighting device by adjusting duty ratios of one or more switching elements, and the duty ratios of one or more switching elements may be adjusted based on information included in the signal received from the signal converter.

The signal converter may include a first communications module communicating with the DALI master controller according to the DALI communication protocol, a second communications module communicating with the lighting driver according to the wireless communication protocol, and a control module inter-converting a first signal conforming to the DALI communication protocol and a second signal conforming to the wireless communication protocol.

The control module may be a plurality of control modules, and one of the plurality of control modules may inter-convert the first and second signals, and the plurality of control modules may be connected to each other to perform communication according to at least one of a serial peripheral interface (SPI), a universal asynchronous receiver transmitter (UART) interface, and an inter-integrated circuit (I2C) interface. The plurality of control modules may be provided as a single integrated circuit (IC).

The control module may extract at least one of address information, device information, and control information from a signal received through the first communications module and conforming to the DALI communication protocol to generate a signal conforming to the wireless communication protocol.

The wireless communication protocol may be a protocol based on at least one of ZigBee™, ultra-side band (UWB), wireless local area network (WLAN), Bluetooth™, infrared data association (IrDA), and radio frequency identification (RFID).

According to another aspect of the present disclosure, a signal converting device may include a first communications module, a second communications module, and a control module. The first communications module communicates with a management server in a wired manner according to a digital addressable lighting interface (DALI) communication protocol. The second communications module communicates with a plurality of lighting drivers operating a plurality of lighting device according to a wireless communication protocol. The control module inter-converts a first signal transmitted and received by the first communications module and conforming to the DALI communication protocol and a second signal transmitted and received by the second communications module and conforming to the wireless communication protocol. The control module transmits and receives different second signals to and from each of the plurality of lighting drivers based on information included in the first signal.

According to another aspect of the present disclosure, a lighting system includes a signal converter and a lighting driver. The signal converter receives across a wired interface a first signal for controlling a lighting device and conforming to a wired communication protocol, and converts the first signal into a second signal for controlling the lighting device and conforming to a wireless communication protocol. The lighting driver includes a wireless communications module receiving across a wireless interface the second signal for controlling the lighting device from the signal converter, and a converter providing a driving signal to the lighting device. The converter controls the driving signal based on the second signal.

The first and second signals may include pulse width modulation (PWM) signal information, and the converter may control a switching element according to the PWM signal information of the second signal in order to adjust a duty ratio of the driving signal provided to the lighting device.

The signal converter may extract address information conforming to the wired communication protocol from the first signal, and may include in the second signal address information of the lighting driver that conforms to the wireless communication protocol and is determined based on the address information extracted from the first signal.

The wireless communications module may transmit across the wireless interface a third signal including device information from the lighting driver, and the signal converter may receive across the wireless interface the third signal and convert the third signal into a fourth signal including the device information from the lighting driver and conforming to the wired communication protocol for transmission across the wired interface.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
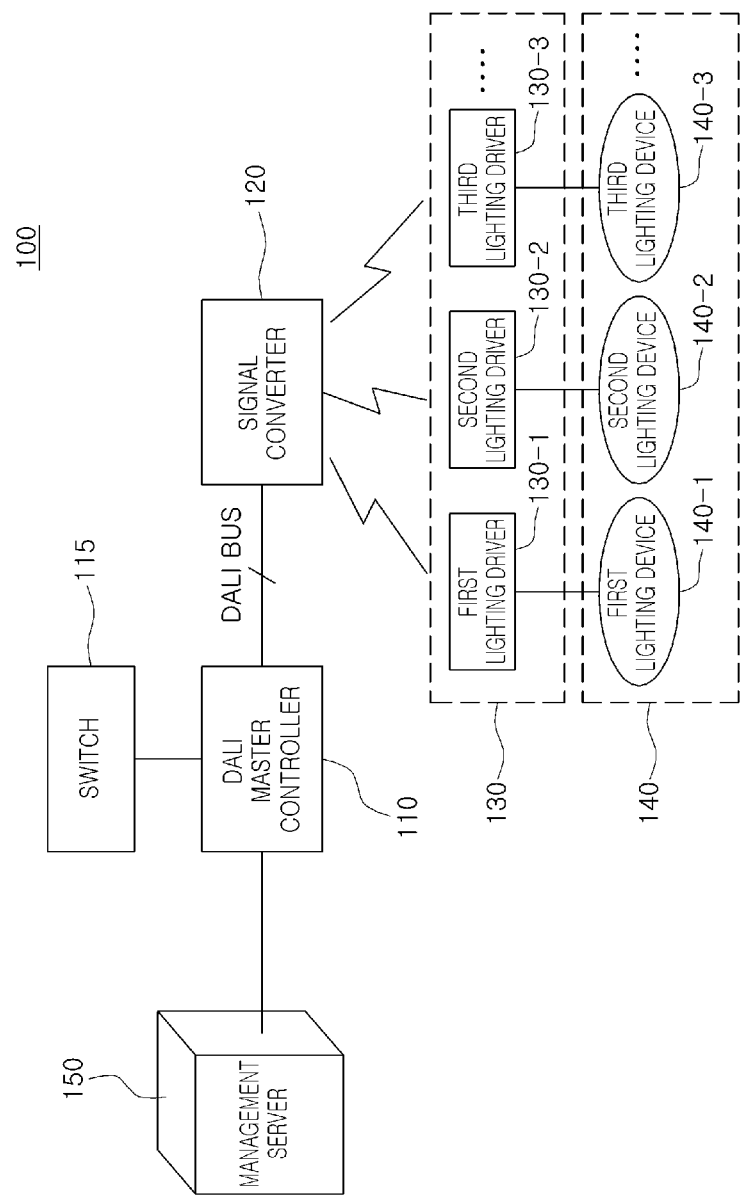
FIGS. 1 and 2 are block diagrams illustrating a lighting system according to an exemplary embodiment of the present disclosure.

Hereinafter, exemplary embodiments of the present disclosure are described in detail below with reference to the accompanying drawings.

The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
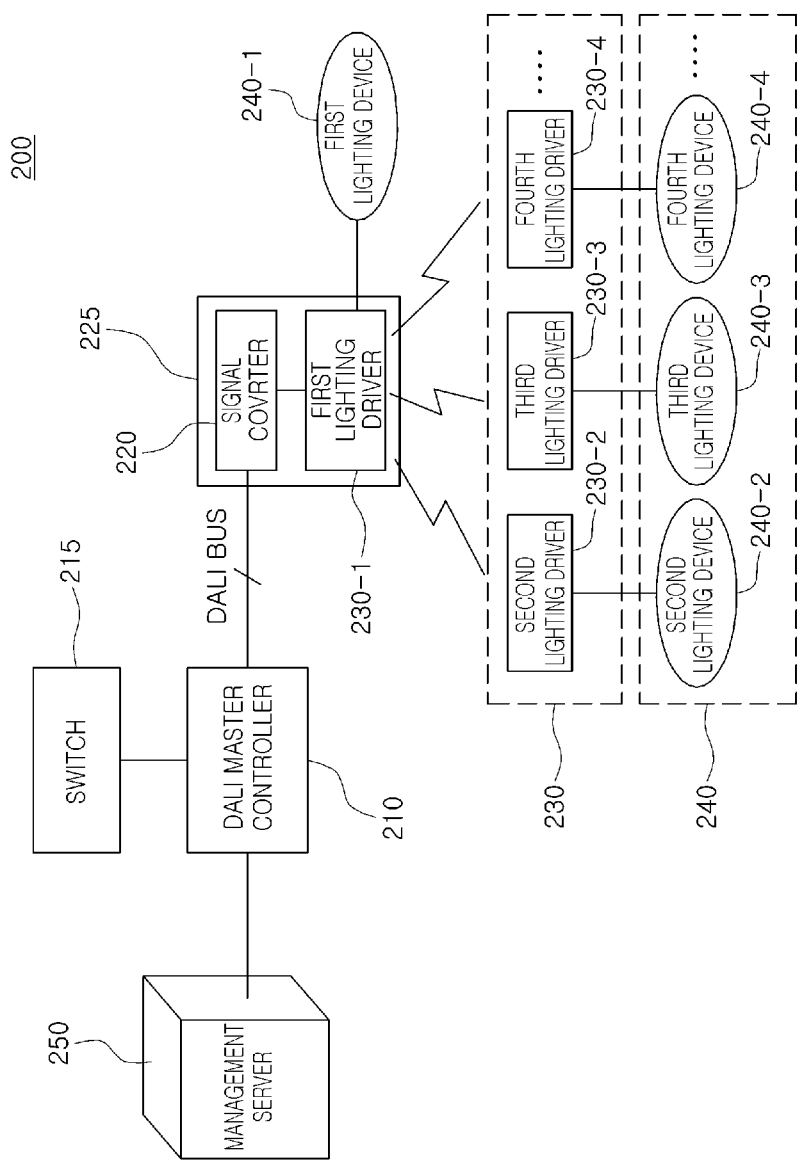

FIGS. 1 and 2 are block diagrams illustrating lighting systems according to exemplary embodiments of the present disclosure.

Referring to FIG. 1, the lighting system 100 may include a digital addressable lighting interface (DALI) master controller 110, a signal converter 120 connected to the DALI master controller 110 through a DALI BUS line, a plurality of lighting drivers 130, and a plurality of lighting devices 140 communicatively connected to the signal converter 120. In FIG. 1, for the purposes of description, the plurality of lighting drivers 130 and the plurality of lighting devices 140 are illustrated separately, but the lighting drivers 130 and the lightning devices 140 may be integrated into and provided as a single lighting module.

The DALI master controller 110 may be communicatively connected to the signal converter 120 and to a management server 150. The DALI master controller 110 and the signal converter 120 may exchange signals through DALI communication (e.g., using a DALI BUS line, and/or a DALI communication protocol). The communication scheme and protocol used for communications between the DALI master controller 110 and the management server 150 is not particularly limited. Namely, optical communication, broadband wire communication, various types of wireless communications schemes, and the like, may be used for communication between the DALI master controller 110 and the management server 150.

Since the DALI master controller 110 and the signal converter 120 are connected by a DALI BUS, they may be connected by a two-wire interface. In this case, signals transmitted and received between the DALI master controller 110 and the signal converter 120 may include forward frame data and backward frame data communicated in accordance with a DALI protocol such as a half-duplex type digital communication protocol. The forward frame may include a total of 19 bits, and the 19-bit data may include address information of the lighting driver(s) 130 desired to be controlled, command information corresponding to a command for controlling the lighting driver(s), and the like.

The signal converter 120 converts a signal transmitted from the DALI master controller 110 according to the DALI protocol into a signal conforming to a wireless communication protocol. Hereinafter, a signal transmitted and received between the DALI master controller 110 and the signal converter 120 according to the DALI protocol will be referred to as a first signal, and a signal transmitted and received between the signal converter 120 and the lighting drivers 130 according to the wireless communication protocol will be referred to as a second signal, for purposes of description. Namely, each of the plurality of lighting drivers 130 may include a wireless communications module to communicate with the signal converter 120 according to the wireless communication protocol.

The signal converter 120 and the lighting drivers 130 may communicate according to communication protocols such as ZigBee™, Bluetooth™, ultra-side band (UWB), infrared transmission (or infrared data association (IrDA)), wireless local area network (WLAN), radio frequency identification (RFID), and the like. The DALI protocol, allowing for communication in a wired manner through the DALI BUS, and the wireless communication protocols generally are different protocols that have different data transmission and reception schemes. As a result, the signal converter 120 may relay communication between the lighting drivers 130 and the DALI master controller 110 by converting between signals based on the DALI protocol and signals based on the wireless communication protocol.

The plurality of lighting drivers 130 may control operations of the plurality of lighting devices 140, and thus, each of the operations of the plurality of lighting devices 140 may be controlled through the DALI master controller 110 and the signal converter 120. In particular, the DALI master controller 110 may transmit a first signal including unique address information allotted to each of the plurality of lighting drivers 130 controlling operations of the plurality of lighting devices 140 to the signal converter 120, and the signal converter 120 may convert the received first signal into a signal conforming to the wireless communication protocol and transmit the converted first signal to the lighting driver 130 corresponding to the address information included in the first signal. Further, each lighting driver 130 may be associated with a corresponding lighting device. Thus, in the lighting system 100 according to the present exemplary embodiment, individual operations of the respective lighting devices 140-1, 140-2, 140-3, . . . , may be independently controlled.

Commands for independently controlling individual operation of each of the lighting devices 140-1, 140-2, 140-3, . . . may be transmitted from the management server 150 or a switch 115 connected to the DALI master controller 110. The management server 150 may transmit control information regarding the respective individual lighting devices 140-1, 140-2, 140-3, . . . , according to environmental conditions such as time, temperature, humidity, and the like, or may transmit control information directly set or input by a user to the DALI master controller 110. The user may transmit control information to the DALI master controller 110 through the switch 115 without passing through the management server 150. The switch 115 may include a plurality of switches in order to individually control operations of the respective individual lighting devices 140-1, 140-2, 140-3, . . . .

In another exemplary embodiment, the signal converter 120 may receive control information regarding the respective lighting devices 140-1, 140-2, 140-3, . . . , remotely through a wireless communications network. In this case, the remotely transmitted control information may be transmitted by using a wireless communications network relaying connections between the signal converter 120 and the respective lighting drivers 130-1, 130-2, 130-3, . . . , or may be transmitted via a different wireless communications network. In a case in which the signal converter 120 and the respective lighting drivers 130-1, 130-2, 130-3, . . . , are connected based on ZigBee communication, the signal converter 120 may receive control information remotely via ZigBee communication or via any other communications network such as IrDA, or the like.

Referring to FIG. 2, a lighting system 200 that is similar to the lighting system 100 illustrated in FIG. 1 is shown. Lighting system 200 may include a DALI master controller 210, a signal converter 220, a plurality of lighting drivers 230-1, 230-2, 230-3, 230-4, . . . , and a plurality of lighting devices 240-1, 240-2, 240-3, 240-4, . . . . Unlike the lighting system 100 according to the exemplary embodiment of FIG. 1, in the exemplary embodiment of FIG. 2, the signal converter 220 may be provided as a single module 225 together with at least one lighting driver 230-1 among the plurality of lighting drivers 230-1, 230-2, 230-3, 230-4, . . . .

The signal converter 220 is provided within a single module 225 together with the first lighting driver 230-1, and may convert a first signal received through a DALI BUS from the DALI master controller 210 into a second signal. The first signal may be a signal conforming to a DALI protocol, and the second signal may be a signal conforming to a wireless communication protocol. The second signal generated by the signal converter 220 may be transmitted to the first lighting driver 230-1 included in the single module 225 with the signal converter 220, and transmitted to the other lighting drivers 230-2, 230-3, 230-4, . . . . In this case, a signal transmitted to the other lighting drivers 230-2, 230-3, 230-4, . . . may be a signal transmitted directly from the signal converter 220 or indirectly via the first lighting driver 230-1.

Each of the lighting drivers 230-1, 230-2, 230-3, 230-4, . . . , may control the operation of a corresponding lighting device among the lighting devices 240-1, 240-2, 240-3, 240-4, . . . , based on the second signal generated by the signal converter 220. The first signal received by the signal converter 220 from the DALI master controller 210 includes address information of one or more respective lighting drivers 230-1, 230-2, 230-3, 230-4, . . . , together with control information regarding the respective one or more lighting devices 240-1, 240-2, 240-3, 240-4, . . . , so the second signal transmitted by the signal converter 220 may be distributed to the respective lighting drivers 230-1, 230-2, 230-3, 230-4, . . . , based on the address information included in the first signal.

Thus, operations of the respective lighting devices 240-1, 240-2, 240-3, 240-4, . . . , may be individually controlled through the DALI master controller 210 and the signal converter 220. A user may transmit a command for controlling operations of the respective lighting devices 240-1, 240-2, 240-3, 240-4, . . . through a management server 250 or a switch 215, or may transmit a command for controlling operations of the respective lighting devices 240-1, 240-2, 240-3, 240-4, . . . by using a separately provided wired/wireless controller, or the like.

Figure 3:
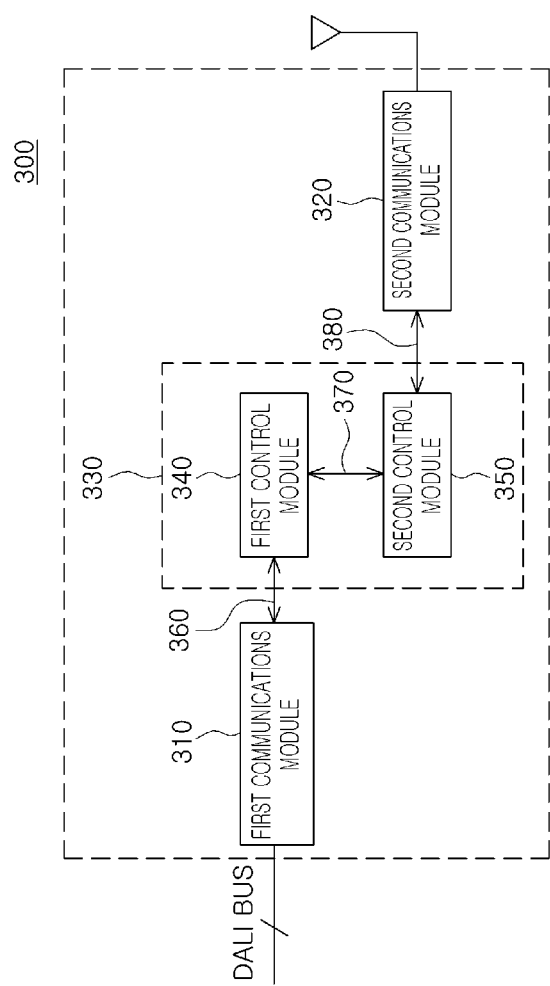
FIGS. 3 and 4 are block diagrams illustrating a signal converting device of the lighting system illustrated in FIG. 1 according to an exemplary embodiment of the present disclosure.
Figure 4:
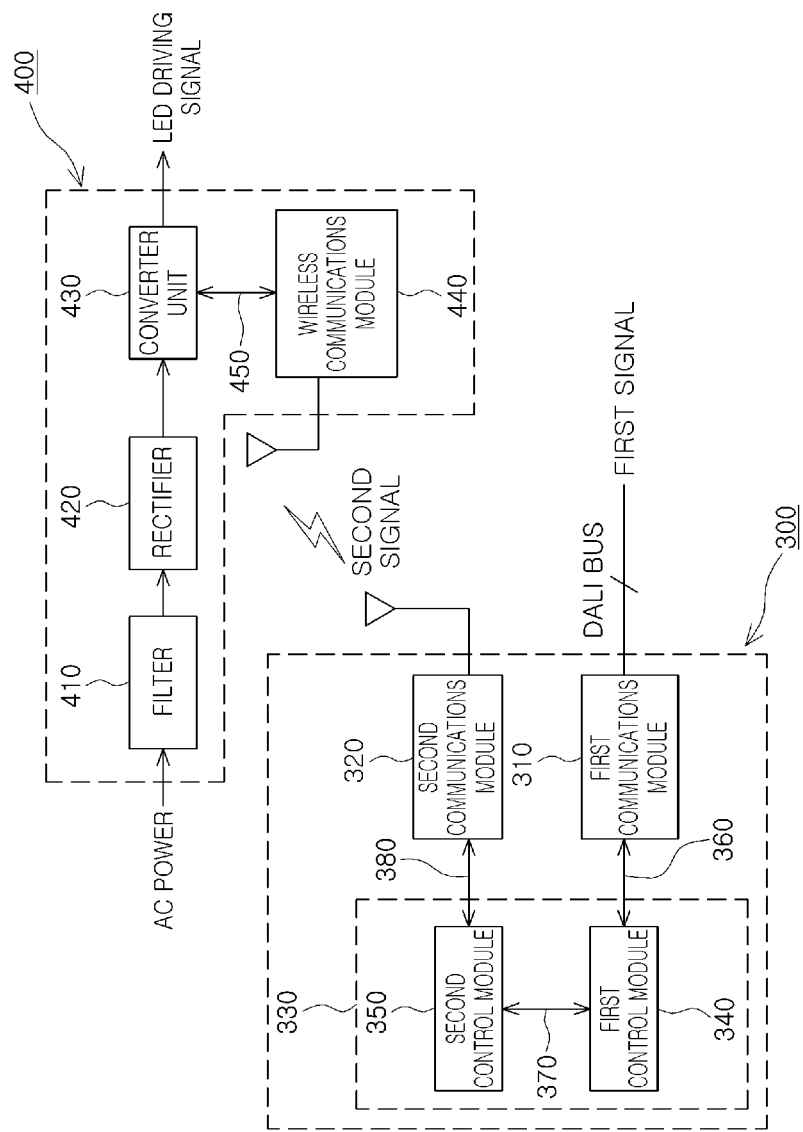

FIGS. 3 and 4 are block diagrams illustrating a signal converting device that can be used in the lighting systems illustrated in FIGS. 1 and 2 according to an exemplary embodiment of the present disclosure.

A signal converting device 300 according to the present exemplary embodiment may correspond to the signal converters 120 and 220 of the lighting systems 100 and 200 illustrated in FIGS. 1 and 2. Referring to FIG. 3, the signal converting device 300 may include a first communications module 310 transmitting and receiving a first signal to and from the DALI master controller 110 or 210 through the DALI BUS, a second communications module 320 transmitting and receiving a second signal to and from the plurality of lighting drivers 130 via a wireless communications network or wireless communications interface, and a control module 330 having a first control module 340 and a second control module 350.

The first control module 340 may include a micro-control unit (MCU) for extracting information included in a first signal received according to the DALI protocol or generating a transmittable first signal according to the DALI protocol by using predetermined information. Similarly, the second control module 350 may include a micro-control unit (MCU) for extracting information included in a second signal received according to the wireless communication protocol or generating a transmittable second signal according to the wireless communication protocol by using predetermined information.

At least one of the first control module 340 and the second control module 35 may perform a protocol conversion function for protocol conversion between the first signal exchanged according to the DALI protocol and the second signal exchanged according to the wireless communication protocol. In the case in which the first control module 340 performs a protocol conversion function, the first control module 340 may extract address information and control information regarding the lighting devices 140 and 240 from the first signal conforming to the DALI protocol. The extracted address information and control information may be converted into information for generating a second signal conforming to the wireless communication protocol, and transmitted to the second control module 350. In turn, the second control module 350 may generate a second signal conforming to the wireless communication protocol based on the information transmitted from the first control module 340.

When the second control module 350 receives second signals according to the wireless communication protocol from the plurality of lighting drivers 130 and 230 via the second communications module 320, the received second signals may be delivered to the first control module 340. The first control module 340 may extract information included in the second signals, generate first signals conforming to the DALI protocol based on the extracted information, and transmit the generated first signals to the DALI master controllers 110 and 210 via the first communications module 310. In this manner, two-way communication between the DALI master controllers 110 and 210 and the plurality of lighting drivers 130 and 230 and the lighting devices 140 and 240 may be implemented using the wireless communication protocol and the DALI protocol.

In other examples, the second control module 350 performs the protocol conversion function. In such examples, the first control module 340 may simply deliver a first signal conforming to the DALI protocol to the second control module 350, and the second control module 350 may extract address information and control information from the received first signal. The second control module 350 may generate a second signal conforming to the wireless communication protocol based on the extracted address information and control information.

In a case in which second signals are delivered from the plurality of lighting drivers 130 and 230, the second control module 350 extracts information included in the second signals received via the second communications module 320, configures first signals conforming to the DALI protocol by using the extracted information, and transmits the first signals to the first control module 340. The first control module 340 may receive the first signals from the second control module 350 and deliver the received first signals to the DALI master controller 110 via the first communications module 310.

Since the first control module 340 includes the MCU compatible with the DALI protocol, communication 360 between the first control module 340 and the first communications module 310 may be executed according to the DALI protocol. Also, since the second control module 350 includes the MCU compatible with the wireless communication protocol, communication 380 between the second control module 350 and the second communications module 320 may be executed according to the wireless communication protocol. In this case, the communication 380 between the second control module 350 and the second communications module 320 may follow the same wireless communication protocol as is used for communications between the second communications module 320 and the lighting drivers 130 and 230.

Meanwhile, the first control module 340 and the second control module 350 may communicate with each other based on at least one of a serial peripheral interface (SPI), a universal asynchronous receiver transmitter (UART) interface, and an inter-integrated circuit (I2C) interface. The first control module 340 and the second control module 350 may communicate based on at least one of the interfaces in a master-slave mode.

FIG. 4 is a block diagram illustrating an operation between a lighting driver 400 operating a lighting device and the signal converting device 300 according to the exemplary embodiment of FIG. 3. Referring to FIG. 4, the lighting driver 400 operating a lighting device may include a filter 410, a rectifier 420, a converter 430, and a wireless communications module 440. The filter 410 removes a noise component included in alternating current (AC) power delivered from the outside (e.g., from an electric power grid), and the AC power having had the noise component removed therefrom may be full-wave rectified by the rectifier 420 to be converted into direct current (DC) power.

The DC power may in turn be converted into an LED driving signal by the converter 430. The converter 430 may include a DC-DC buck converter, and in an exemplary embodiment, the converter 430 may include a buck converter or a power factor correction (PFC) converter and a buck converter. In a case in which the converter 430 includes a buck converter, a voltage level of the LED driving signal output by the converter 430 may be determined by a duty ratio of a switching element included in the buck converter.

As described above, operation of the lighting driver 400 in the exemplary embodiment of the present disclosure may be determined by the first signals delivered from the DALI master controllers 110 and 210 according to the DALI protocol. Namely, a first communications module 310 connected to the DALI master controllers 110 and 210 receives the first signals conforming to the DALI protocol, and the first signals may include address information of the lighting driver 400 and control information for controlling operation of the lighting driver 400.

In the present exemplary embodiment, a first signal received by the first communications module 310 through the DALI BUS may include address information for the lighting driver 400 and control information regarding a duty ratio for a switching element included in the converter 430. The first signal may be converted into a second signal conforming to the wireless communication protocol by the first control module 340 or the second control module 350, and delivered to the wireless communications module 440 via a second communications module 320. The second signal may be delivered to the wireless communications module 440 included in the target lighting driver 400 that is associated with the address information included in the first signal. In turn, operation of driving circuitry of the converter 430 included in the lighting driver 400, or the like, may be controlled according to the control signal included in the first signal and transmitted in the second signal. The second signal may include pulse width modulation (PWM) signal information allowing for adjustment of a duty ratio of a switching element included in the converter 430.

Meanwhile, in the exemplary embodiment of FIG. 4, communications 360, 370, and 380 among the respective modules 310, 320, 340, and 350 may be performed in the same manner as described above in relation to the exemplary embodiment of FIG. 3.

Figure 5:
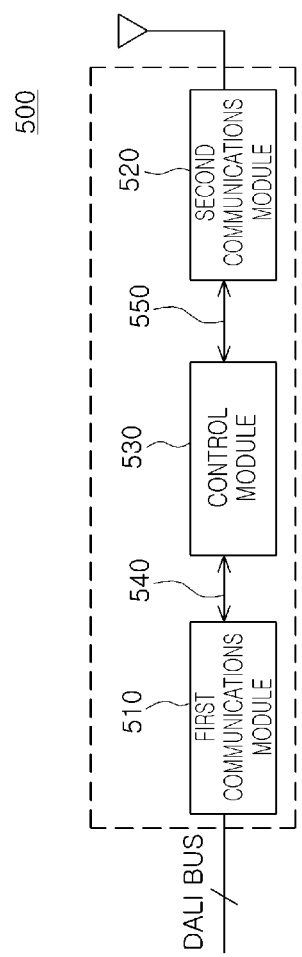
FIGS. 5 and 6 are block diagrams illustrating a signal converting device of the lighting system illustrated in FIG. 2 according to an exemplary embodiment of the present disclosure.
Figure 6:
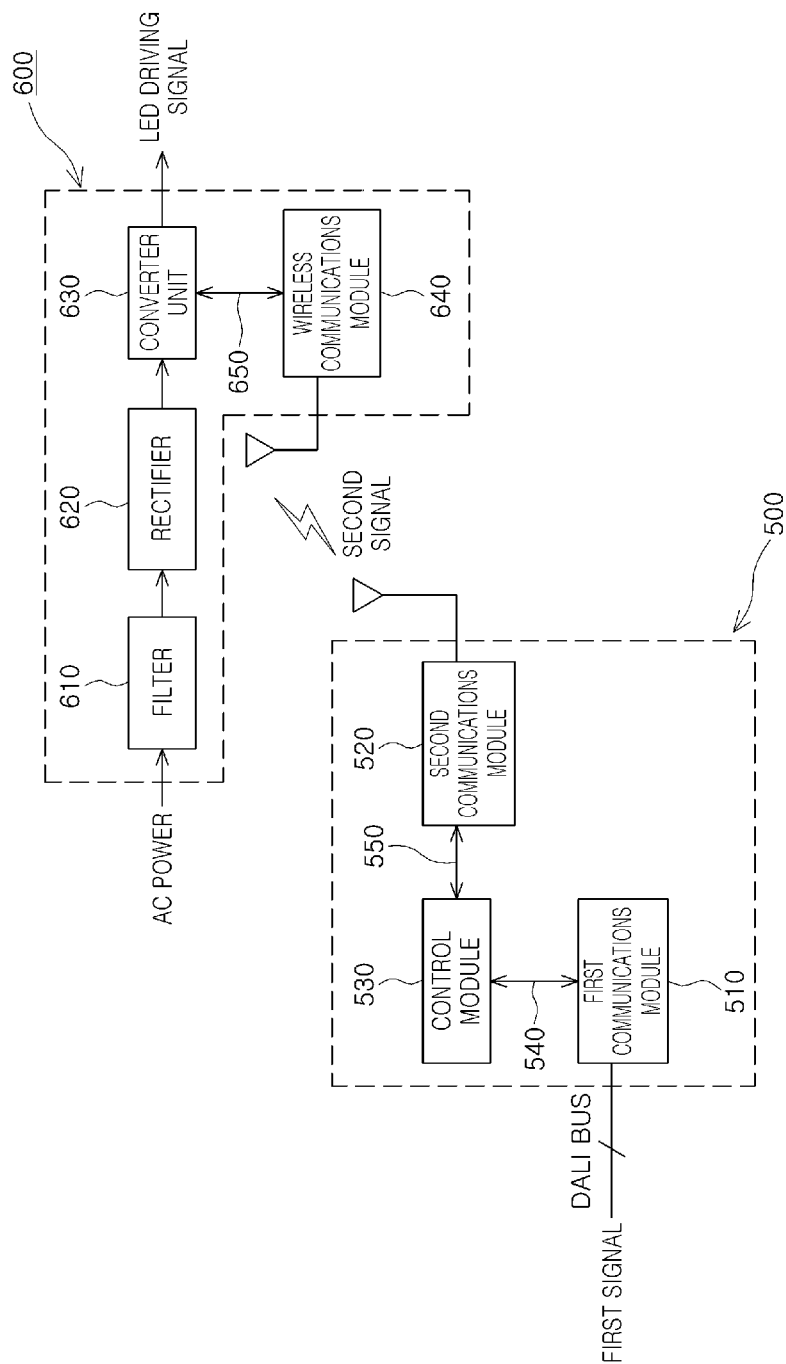

FIGS. 5 and 6 are block diagrams illustrating a signal converting device 500 of the lighting system illustrated in FIG. 2 according to an exemplary embodiment of the present disclosure.

Referring to FIG. 5, a signal converting device 500 according to the present exemplary embodiment may include a first communications module 510, a second communications module 520, and a control module 530. The first communications module 510 may be connected to the DALI master controllers 110 and 210 through a DALI BUS, and the second communications module 520 may be connected to the plurality of lighting drivers 130 and 230 via a wireless communications network. In a case in which the signal converting device 500 is applied to the lighting system 200 illustrated in FIG. 2, the signal converting device 500 may be provided as a single module 225 together with at least one lighting driver 230-1 among the plurality of lighting drivers 230.

Unlike the exemplary embodiments of FIGS. 3 and 4, in the exemplary embodiment of FIG. 5, only the single control module 530 may be provided in the signal converting device 500. The control module 530 may relay a first signal exchanged between the first communications module 510 and the DALI master controllers 110 and 210 according to the DALI protocol and a second signal exchanged between the second communications module 520 and the plurality of lighting drivers 130 and 230 according to the wireless communication protocol. Namely, the control module 530 may convert the first signal into a second signal or the second signal into a first signal.

Referring to FIG. 6, a lighting driver 600 may include a filter 610, a rectifier 620, a converter 630, and a wireless communications module 640. In the exemplary embodiment of FIG. 6, the filter 610, the rectifier 620, the converter 630, and the wireless communications module 640 included in the lighting driver 600 may operate in a manner similar to that of the filter 510, the rectifier 520, the converter 530, and the wireless communications module 540 of the lighting driver 500 illustrated in FIG. 5.

The control module 530 may convert a first signal received by the first communications module 510 and conforming to the DALI protocol into a second signal conforming to a wireless communication protocol. The second signal generated by the control module 530 may be delivered to the converter 630 via the second communications module 520 and the wireless network to determine or control characteristics of the LED driving signal generated by the lighting driver 600. For example, the second signal may include PWM signal information for adjusting a duty ratio of a switching element included in the converter 630. The lighting driver 600 may include the wireless communications module 640 connected to communicate with the second communications module 520 through a wireless communications network.

Meanwhile, the second communications module 520 may receive information regarding an operational state of the lighting driver 600 from the lighting driver 600. In this case, the information regarding an operational state of the lighting driver 600 may have a second signal format conforming to a wireless communication protocol of the wireless communications network connecting the signal converting device 500 and the lighting driver 600. The control module 530 may convert the second signal including the information regarding an operational state of the lighting driver 600 into a first signal conforming to the DALI protocol. The converted first signal may be delivered to the DALI master controllers 110 and 210 through the first communications module 510, and the DALI master controllers 110 and 210 may deliver the information included in the first signal to the management servers 150 and 250. Thus, the management servers 150 and 250 may monitor an operational state of the lighting driver 600 in real time and transmit new information required for controlling the operation of the lighting driver 600 based on the operational state information of the lighting driver 600 delivered from the DALI master controllers 110 and 210.

Figure 7:
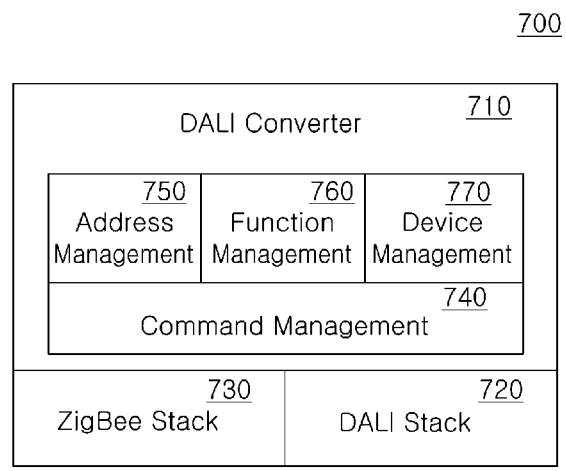
FIG. 7 is a block diagram of a communications protocol stack applicable to a signal converting device according to an exemplary embodiment of the present disclosure.

FIG. 7 is a block diagram of a communications protocol stack applicable to a signal converting device according to an exemplary embodiment of the present disclosure.

In an embodiment of FIG. 7, it is assumed that a wireless communications network between the signal converters 120 and 220 and the lighting drivers 130 and 230 is a ZigBee communications network, but the present disclosure is not limited thereto. As mentioned above, besides ZigBee™, Bluetooth™ UWB, WLAN, RFID, IrDA, or the like, may be used as the wireless communications network between the signal converters 120 and 220 and the lighting drivers 130 and 230.

Referring to FIG. 7, a DALI converter protocol 710 used by the signal converters 120 and 220 may be configured above a DALI stack 720 and a ZigBee stack 730 and may include a command management stack 740, an address management stack 750, a function management stack 760, a device management stack 770, and the like. The command management stack 740 may analyze a command delivered according to a DALI protocol or a ZigBee protocol and convert the command into a command conforming to the ZigBee protocol or the DALI protocol. Also, the command management stack 740 may deliver the analyzed command to the address management stack 750, the function management stack 760, and the device management stack 770.

The address management stack 750 may inter-convert address information conforming to the DALI protocol and address information conforming to the ZigBee protocol, and the function management stack 760 may support execution of a command conforming to the DALI protocol delivered from the DALI master controllers 110 and 210. Meanwhile, the device management stack 770 may manage a control signal, for example, a PWM signal, from the lighting drivers 130 and 230 for operating the lighting devices 140 and 240 including an LED.

Figure 8:
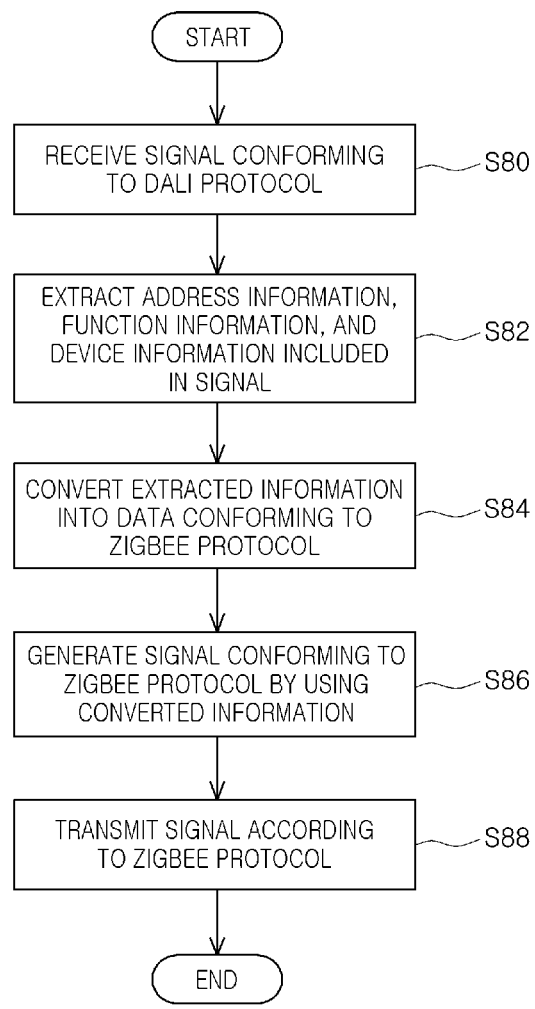
FIG. 8 is a flow chart illustrating an operation of the signal converting device according to an exemplary embodiment of the present disclosure.

FIG. 8 is a flow chart illustrating an operation of the signal converting device according to an exemplary embodiment of the present disclosure.

Referring to FIG. 8, signal converting devices 300 and 400 according to the present exemplary embodiment may receive a first signal conforming to a DALI protocol through DALI master controllers 110 and/or 210 (S80). The first signal conforming to the DALI protocol may include address information, function information, device information, and the like, regarding lighting devices 140 and/or 240. Control modules 330, 340, and 350 of the signal converting devices 300 and 400 may extract the address information, the function information, and the device information from the first signal (S82).

In operation S82, the address information may be extracted by the address management stack 750 of the DALI converter protocol 710, and the function information may be extracted by the function management stack 760. Meanwhile, the device information may be extracted by the device management stack 770. The device information may include PWM signal information for determining an operation of the lighting drivers 400 and/or 600 driving the lighting devices 140 and/or 240, respectively, or the like. The extracted information may be converted into data appropriate for generating a second signal conforming to the ZigBee protocol (S84).

The command management stack 740 of the DALI converter protocol 710 may generate a second signal conforming to the ZigBee protocol by using the data generated in operation S84 (S86). In order to be matched to the first signal, the second signal may include address information of the lighting devices 140 and 240/or and PWM signal information required for controlling an operation of the lighting devices 140 and/or 240, and the like. The second signal conforming to the ZigBee protocol may be transmitted (S88) and delivered to the lighting drivers 400 and/or 600 via the second communications module 320 and/or 520.

In FIG. 8, the embodiment in which information included in the first signal received according to the DALI protocol is extracted and converted into data conforming to a wireless communication protocol to generate the second signal is illustrated; however, the opposite operation may also be available. Namely, a second signal including PWM signal information, address information, and the like, required for controlling the lighting drivers 400 and/or 600, may be received through a wireless communications network, and the information included in the received second signal may be extracted.

The information included in the second signal may be extracted by the command management stack 740 of the DALI converter protocol 710 configured above the ZigBee stack 730. The extracted information may be converted into data appropriate for the DALI protocol by the device management stack 740, the function management stack 760, and the device management stack 770 included in the DALI converter protocol 710, and the command management stack 760 may generate a DALI command by using the converted data. The signal converting devices 300 and/or 500 may transmit the first signal including the DALI command to the DALI master controllers 110 and/or 210, thus mediating inter-conversion between the first and second signals conforming to different protocols.

Meanwhile, the signal converting devices 300 and 500 and the lighting systems 100 and 200 as described above may be applied to an indoor lighting device or an outdoor lighting device according to the purpose thereof. The indoor LED lighting device may include a lamp, a fluorescent lamp (LED-tube), or a flat panel type lighting device replacing an existing lighting fixture (retrofit), and the outdoor LED lighting device may include a streetlight, a security light, a flood light, a scene lamp, a traffic light, and the like.

Also, the lighting device using LEDs may be utilized as an internal or external light source of a vehicle. As an internal light source, the LED lighting device may be used as an indoor light, a reading light, or as various dashboard light sources of a vehicle. As an external light source, the LED lighting device may be used as a headlight, a brake light, a turn signal lamp, a fog light, a running light, and the like.

In addition, the LED lighting device may also be applicable as a light source used in robots or various mechanic facilities. LED lighting using light within a particular wavelength band may promote plant growth and stabilize a person's mood or treat diseases using emotional lighting.

A lighting system employing the foregoing lighting device will be described with reference to FIGS. 9 through 12. The lighting system according to the present exemplary embodiment may automatically regulate color temperature according to conditions of a surrounding environment (for example, temperature and humidity) and provide a lighting device used for emotional lighting satisfying human emotional needs, rather than serving as simple lighting.

Figure 9:
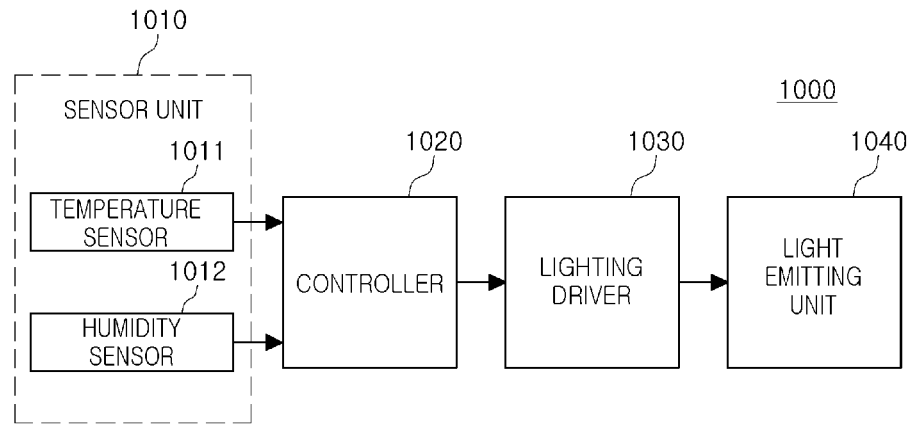
FIG. 9 is a block diagram schematically illustrating a lighting system according to an exemplary embodiment of the present disclosure.

FIG. 9 is a block diagram schematically illustrating a lighting system according to an exemplary embodiment of the present disclosure.

Referring to FIG. 9, a lighting system 1000 according to an exemplary embodiment of the present disclosure may include a sensor unit 1010, a controller 1020, a lighting driver 1030, and a light emitting unit 1040.

The sensor unit 1010 may be installed indoors or outdoors, and may have a temperature sensor 1011 and a humidity sensor 1012 to measure at least one air condition selected among ambient temperature and humidity. The sensor unit 1010 delivers the temperature and/or humidity measurement to the controller 1020 electrically connected thereto.

The controller 1020 may compare the air temperature and/or humidity measurement with air conditions (temperature and humidity ranges) previously set by a user, and determine a color temperature for the light emitting unit 1040 corresponding to the measured air condition(s). The controller 1020 may be electrically connected to the lighting driver 1030 and control the lighting driver 1030 to drive the light emitting unit 1040 at the determined color temperature.

Figure 10:
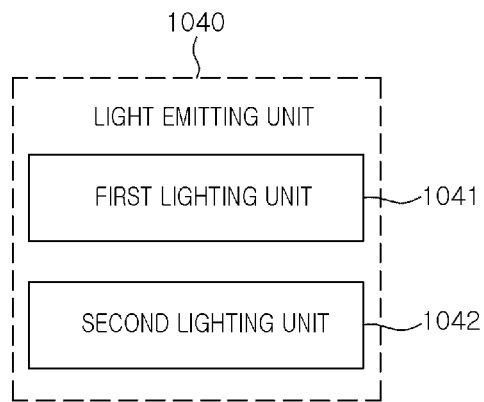
FIG. 10 is a block diagram schematically illustrating a detailed configuration of a lighting emitting unit of the lighting device illustrated in FIG. 9.

The light emitting unit 1040 operates through power supplied by the lighting driver 1030. The light emitting unit 1040 may include at least one of the lighting devices illustrated in FIGS. 10 to 12. For example, as illustrated in FIG. 10, the light emitting unit 1040 may include a first lighting unit 1041 and a second lighting unit 1042 having different color temperatures, and the lighting units 1041 and 1042 may each include a plurality of light emitting devices emitting the same white light.

The first lighting unit 1041 may emit white light having a first color temperature, and the second lighting unit 1042 may emit white light having a second color temperature, where the first color temperature may be lower than the second color temperature. Conversely, in other examples, the first color temperature may be higher than the second color temperature. Here, white color having a relatively low color temperature corresponds to a warmer white color, and white color having a relatively high color temperature corresponds to a colder white color. When power is supplied to the first and second lighting units 1041 and 1042, the first and second lighting units 1041 and 1042 emit white light having first and second color temperatures, respectively, and the respective white light may be mixed to implement white light having a color temperature determined by the controller 1020.

In detail, in a case in which the first color temperature is lower than the second color temperature, if the color temperature determined by the controller 1020 is relatively high, an amount of light from the first lighting unit 1041 may be reduced and an amount of light from the second lighting unit 1042 may be increased to implement mixed white light having the determined color temperature. Conversely, when the determined color temperature is relatively low, an amount of light from the first lighting unit 1041 may be increased and an amount of light from the second lighting unit 1042 may be reduced to implement white light having the determined color temperature. Here, the amount of light from each of the lighting units 1041 and 1042 may be implemented by regulating an amount of power supplied from the lighting driver 1030 to the all of the light emitting devices forming the lighting unit (1041 or 1042), or by regulating the number of light emitting devices of the lighting unit (1041 or 1042) that are being driven.

Figure 11:
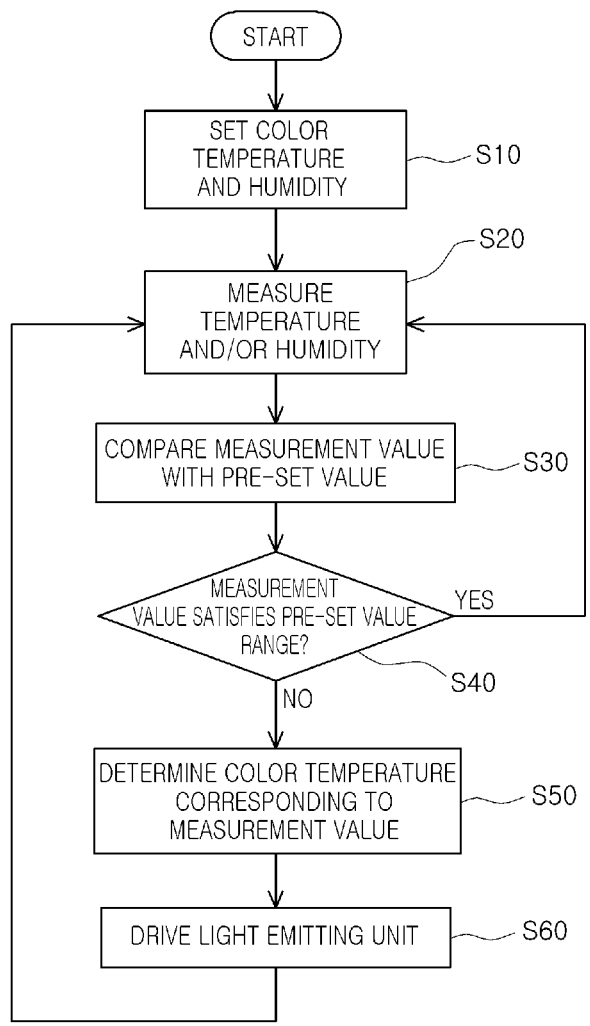
FIG. 11 is a flow chart illustrating a method for controlling the lighting device illustrated in FIG. 9.

FIG. 11 is a flowchart illustrating a method of controlling the lighting system of FIG. 9. Referring to FIG. 11, the user first sets a plurality of different color temperatures each associated with temperature and/or humidity ranges through the controller 1020 (S10). The set temperature and humidity data are stored in the controller 1020.

In general, when a color temperature is higher than or equal to 6000K, a color providing a cool feeling, such as blue, may be produced, and when a color temperature is lower than 4000K, a color providing a warm feeling, such as red, may be produced. Thus, in the present exemplary embodiment, when temperature and humidity exceed 20° C. and 60%, respectively, the user may set the light emitting unit 1040 to be turned on to have a color temperature higher than 6000K through the controller 1020; when the temperature and humidity range from 10° C. to 20° C. and 40% to 60%, respectively, the user may set the light emitting unit 1040 to be turned on to have a color temperature ranging from 4000K to 6000K; and when the temperature and humidity are lower than 10° C. and 40%, respectively, the user may set the light emitting unit 1040 to be turned on to have a color temperature lower than 4000K.

Next, the sensor unit 1010 measures at least one condition among ambient temperature and humidity (S20). The temperature and/or humidity measured by the sensor unit 1010 are delivered to the controller 1020.

Subsequently, the controller 1020 compares the measurement value(s) delivered from the sensor unit 1010 with pre-set values (S30). Here, the measurement value(s) is/are temperature and/or humidity data measured by the sensor unit 1010 (e.g., in step S20), and the set values are temperature and/or humidity data which have been set by the user and stored in the controller 1020 in advance (e.g., in step S10). The controller 1020 compares the measured temperature and/or humidity with the pre-set temperature and humidity, respectively.

According to the comparison results, the controller 1020 determines whether the measurement values satisfy the pre-set ranges (S40). When the measurement values satisfy the pre-set values, the controller 1020 maintains a current color temperature, and again measures the temperature and humidity (S20). Meanwhile, when the measurement values do not satisfy the pre-set values, the controller 1020 detects pre-set values corresponding to the measurement values, and determines a corresponding color temperature (S50). The controller 1020 controls the lighting driver 1030 to drive the light emitting unit 1040 at the determined color temperature.

Then, the lighting driver 1030 drives the light emitting unit 1040 to have the determined color temperature (S60). The lighting driver 1030 supplies the power required to drive the light emitting unit 1040 to implement the predetermined color temperature. Accordingly, the light emitting unit 1040 may be adjusted to have a color temperature corresponding to the temperature and humidity previously set by the user according to ambient temperature and humidity.

In this manner, the lighting system 1000 is able to automatically regulate a color temperature of the indoor lighting according to changes in ambient temperature and humidity, thereby satisfying human emotional needs varying according to changes in the surrounding natural environment and providing psychological stability.

Figure 12:
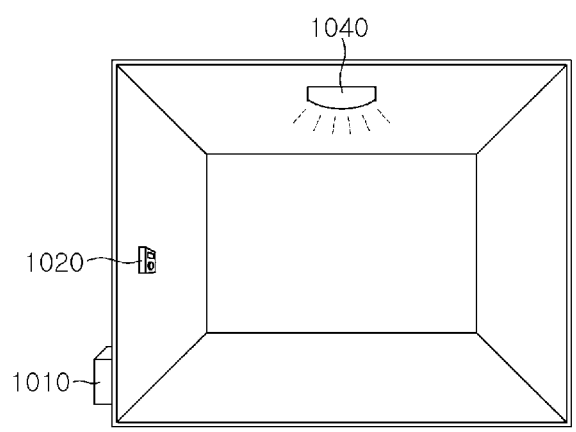
FIG. 12 is a view schematically illustrating the way in which the lighting system illustrated in FIG. 9 is used.

FIG. 12 is a view schematically illustrating an application of the lighting system of FIG. 9. As illustrated in FIG. 12, the light emitting unit 1040 may be installed on the ceiling as an indoor lamp. Here, the sensor unit 1010 may be implemented as a separate device and installed on an external wall in order to measure outdoor temperature and humidity. The controller 1020 may be installed in an indoor area to allow the user to easily perform setting and ascertainment operations. The lighting system is not limited thereto, but may be installed on the wall in place of an interior illumination device or may be applied to a lamp, such as a desk lamp that can be used indoors and outdoors.

Hereinafter, another example of a lighting system using the foregoing lighting device will be described with reference to FIGS. 13 through 16. The lighting system according to the present exemplary embodiment may automatically perform a predetermined control by detecting a motion of a monitored target and an intensity of illumination at a location of the monitored target.

Figure 13:
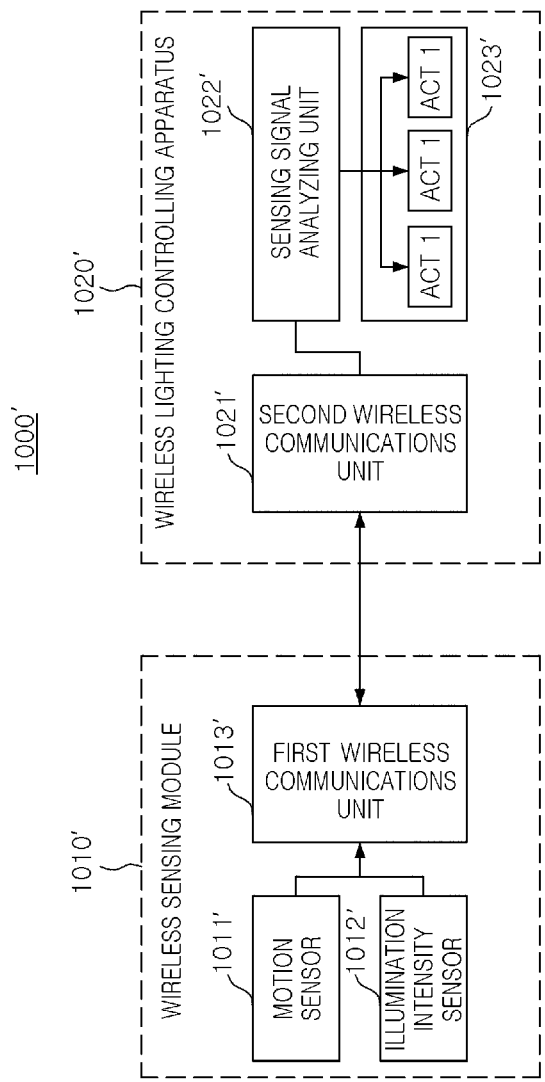
FIG. 13 is a block diagram of a wireless lighting system according to another exemplary embodiment of the present disclosure.

FIG. 13 is a block diagram of a lighting system according to another exemplary embodiment of the present disclosure.

Referring to FIG. 13, a lighting system 1000' according to the present exemplary embodiment may include a wireless sensing module 1010' and a wireless lighting controlling apparatus 1020'.

The wireless sensing module 1010' may include a motion sensor 1011', an illumination intensity sensor 1012' sensing an intensity of illumination, and a first wireless communications unit 1013'. The first wireless communications unit generates a wireless signal including a motion sensing signal from the motion sensor 1011' and an illumination intensity sensing signal from the illumination intensity sensor 1012' and complying with a predetermined communications protocol (e.g., a ZigBee protocol), and transmits the same. The first wireless communications unit 1013' may include a first ZigBee communications unit generating a ZigBee signal compliant with a predetermined communications protocol and transmitting the same.

The wireless lighting controlling apparatus 1020' may include a second wireless communications unit 1021' receiving the wireless signal from the first wireless communications unit and restoring a sensing signal, a sensing signal analyzing unit 1022' analyzing the sensing signal from the second wireless communications unit 1021', and an operation control unit 1023' performing a predetermined control based on analysis results from the sensing signal analyzing unit 1022'. The second wireless communications unit 1021' may be configured as a second ZigBee communications unit receiving the ZigBee signal from the first wireless communications unit 1013' (e.g., a ZigBee communications unit) and restoring a sensing signal.

Figures 14, 15:
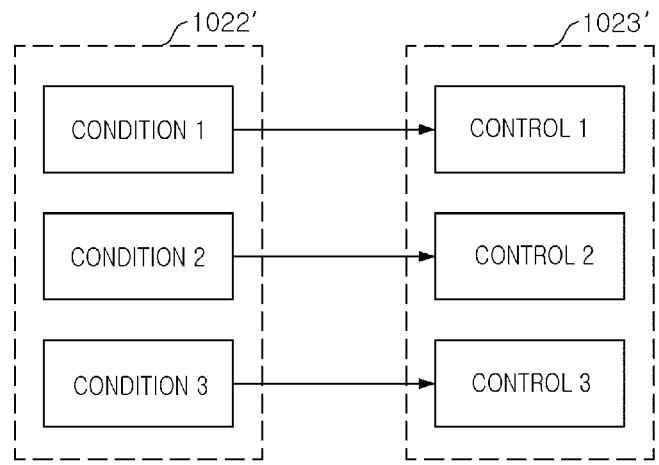
FIG. 14 is a view illustrating a format of a ZigBee signal employable in a wireless lighting system according to an exemplary embodiment of the present disclosure.
FIG. 15 is a view illustrating a sensing signal analyzing unit and an operation control unit according to an exemplary embodiment of the present disclosure.

FIG. 14 is a view illustrating a format of a ZigBee signal according to an exemplary embodiment of the present disclosure.

Referring to FIG. 14, the ZigBee signal from the first wireless communications unit 1013' operating as a ZigBee communications unit may include channel information (CH) defining a communications channel, wireless network identification (ID) information (PAN_ID) defining a wireless network, a device address (Ded_Add) designating a target device, and sensing data including the motion and illumination intensity sensing signal values.

Also, the ZigBee signal from the second wireless communications unit 1021' operating as a ZigBee communications unit may include channel information (CH) defining a communications channel, wireless network identification (ID) information (PAN_ID) defining a wireless network, a device address (Ded_Add) designating a target device, and sensing data including the motion and illumination intensity sensing signal.

The sensing signal analyzing unit 1022' may analyze the sensing signal from the second wireless communications unit 1021' operating as a ZigBee wireless communications unit to detect a satisfied condition, among a plurality of conditions, based on the sensed motion and the sensed intensity of illumination.

Here, the operation control unit 1023' may store a plurality of controls each associated with a condition among a plurality of conditions, and perform a control among the plurality of controls corresponding to the condition detected by the sensing signal analyzing unit 1022'.

FIG. 15 is a view illustrating the sensing signal analyzing unit 1022' and the operation control unit 1023' according to the exemplary embodiment of the present disclosure. Referring to FIG. 15, for example, the sensing signal analyzing unit 1022' may analyze the sensing signal from the second wireless communications unit 1021' and detect a satisfied condition among first, second, and third conditions (condition 1, condition 2, and condition 3), based on the sensed motion and sensed intensity of illumination.

The operation control unit 1023' may set one of a first, second, and third controls (control 1, control 2, and control 3) corresponding to one of the first, second, and third conditions (condition 1, condition 2, and condition 3) previously set by the sensing signal analyzing unit 1022', and perform a control corresponding to the condition detected by the sensing signal analyzing unit 1022'.

Figure 16:
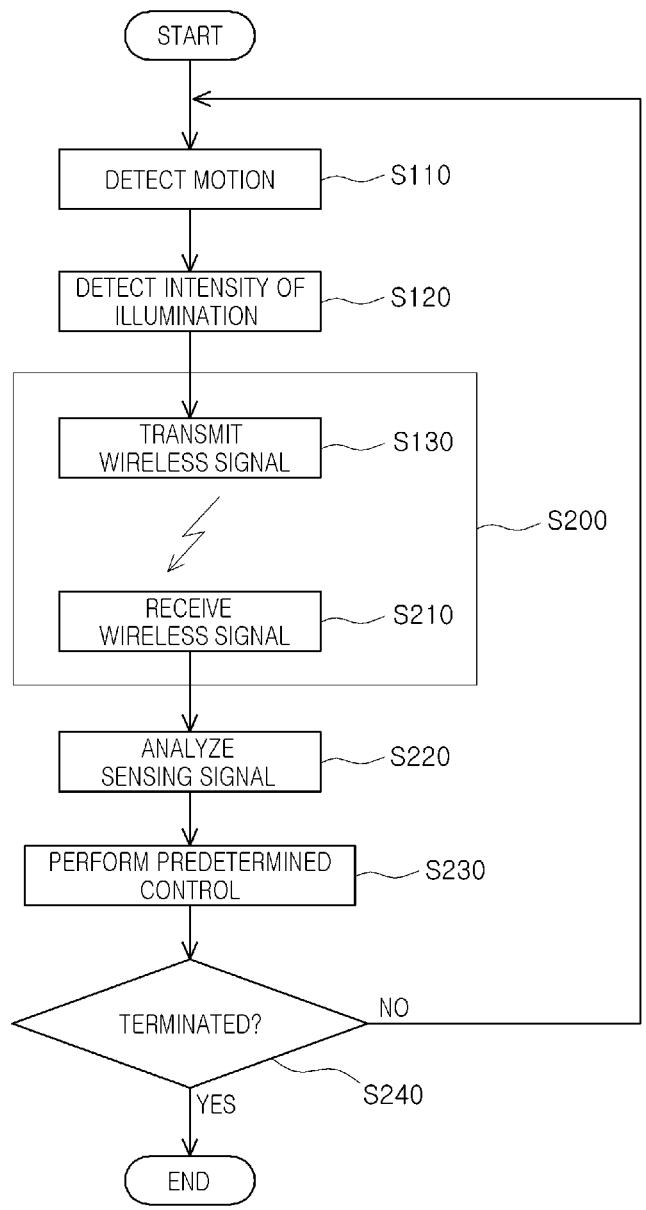
FIG. 16 is a flow chart illustrating an operation of a wireless lighting system according to an exemplary embodiment of the present disclosure.

FIG. 16 is a flowchart illustrating an operation of a wireless lighting system according to an exemplary embodiment of the present disclosure.

Referring to FIG. 16, in operation S110, the motion sensor 1011' detects a motion. In operation S120, the illumination intensity sensor 1012' detects an intensity of illumination. Operation S200 is a process of transmitting and receiving a wireless signal (e.g., a ZigBee signal), and may include operation S130 of transmitting a wireless signal by the first wireless communications unit 1013' and operation S210 of receiving the wireless signal by the second wireless communications unit 1021'. In operation S220, the sensing signal analyzing unit 1022' analyzes the sensing signal extracted from the received signal. In operation S230, the operation control unit 1023' performs a predetermined control. In operation S240, it is determined whether the lighting system is terminated, and processing ends if the lighting system is terminated while processing proceeds to step S110 if the lighting system is not terminated.

Operations of the wireless sensing module and the wireless lighting controlling device according to an exemplary embodiment of the present disclosure will be described with reference to FIGS. 13 through 16.

First, the wireless sensing module 1010' of the wireless lighting system 1000' according to an exemplary embodiment of the present disclosure will be described with reference to FIGS. 13, 14, and 16. The wireless lighting system 1000' according to the present exemplary embodiment is installed in a location in which a lighting device is installed, such that a current intensity of illumination of the lighting device and human motion near the lighting device can be detected.

The motion sensor 1011' of the wireless sensing module 1010' is configured as an infrared sensor, or the like, capable of sensing a human. The motion sensor 1011' senses a motion and provides information on the sensed movement to the first wireless communications unit 1013' (S110 in FIG. 16). The illumination intensity sensor 1012' of the wireless sensing module 1010' senses an intensity of illumination and provides the same to the first wireless communications unit 1013' (S120).

Accordingly, the first wireless communications unit 1013' generates a wireless signal including the motion sensing signal from the motion sensor 1010' and the illumination intensity sensing signal from the illumination intensity sensor 1012' and complying with a predetermined communications protocol, and transmits the generated wireless signal wirelessly (S130).

Referring to FIG. 14, the wireless signal from the first wireless communications unit 1013' may include channel information (CH) defining a communications channel, wireless network identification (ID) information (PAN_ID) defining a wireless network, a device address (Ded_Add) designating a target device, and sensing data. The sensing data includes a motion value and an illumination intensity value.

Next, the wireless lighting controlling apparatus 1020' of the wireless lighting system according to an exemplary embodiment of the present disclosure will be described with reference to FIGS. 13 through 16. The wireless lighting controlling apparatus 1020' of the wireless lighting system 1000' according to the present exemplary embodiment may control a predetermined operation according to an illumination intensity value and a motion value included in a wireless signal received from the wireless sensing module 1010'.

The second wireless communications unit 1021' of the wireless lighting controlling apparatus 1020' according to the present exemplary embodiment receives the wireless signal from the first wireless communications unit 1013', restores or retrieves a sensing signal therefrom, and provides the restored sensing signal to the sensing signal analyzing unit 1022' (S210 in FIG. 16).

Referring to FIG. 14, the wireless signal from the second wireless communications unit 1021' may include channel information (CH) defining a communications channel, wireless network identification (ID) information (PAN_ID) defining a wireless network, a device address (Ded_Add) designating a target device, and sensing data. A wireless network may be identified based on the channel information (CH) and the wireless network ID information (PAN_ID), and a sensed device may be recognized based on the device address. The sensing data includes a motion value and an illumination intensity value.

Also, referring to FIG. 13, the sensing signal analyzing unit 1022' analyzes the illumination intensity value and the motion value included in the sensing signal from the second wireless communications unit 1021' and provides the analysis results to the operation control unit 1023' (S220 in FIG. 16).

Accordingly, the operation control unit 1023' may perform a predetermined control according to the analysis results from the sensing signal analyzing unit 1022' (S230).

The sensing signal analyzing unit 1022' may analyze the sensing signal from the second wireless communications unit 1021' and detect a satisfied condition, among a plurality of conditions, based on the sensed motion and intensity of illumination. Here, the operation control unit 1023' may store a plurality of controls corresponding to the plurality of conditions set in advance by the sensing signal analyzing unit 1022', and perform a control corresponding to the condition detected by the sensing signal analyzing unit 1022'.

For example, referring to FIG. 15, the sensing signal analyzing unit 1022' may detect a satisfied condition among the first, second, and third conditions (condition 1, condition 2, and condition 3) based on the sensed motion and intensity of illumination by analyzing the sensing signal from the second wireless communications unit 1021'.

In this case, the operation control unit 1023' may set first, second, and third controls (control 1, control 2, and control 3) corresponding to the first, second, and third conditions (condition 1, condition 2, and condition 3) set in advance by the sensing signal analyzing unit 1022', and perform a control corresponding to the condition detected by the sensing signal analyzing unit 1022'.

For example, when the first condition (condition 1) corresponds to a case in which human motion is sensed at a front door and an intensity of illumination at the front door is not low, the first control may turn off all pre-set lamps. When the second condition (condition 2) corresponds to a case in which human motion is sensed at the front door and an intensity of illumination at the front door is low, the second control may turn on a part of pre-set lamps (for example, a part of lamps at the front door and a part of lamps in a living room). When the third condition (condition 3) corresponds to a case in which human motion is sensed at the front door and an intensity of illumination at the front door is very low, the third control may turn on all the pre-set lamps.

Unlike the foregoing cases, besides the operation of turning the lamps on or off, the first, second, and third controls may be variously applied according to pre-set operations. For example, the first, second, and third controls may be associated with operations of a lamp and an air-conditioner during the summer or with operations of a lamp and heating during the winter.

Other examples of a lighting system will be described with reference to FIGS. 17 through 20.

Figure 17:
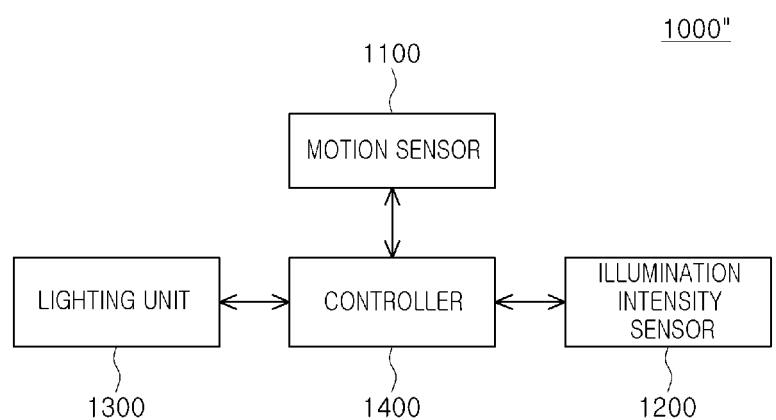
FIG. 17 is a block diagram schematically illustrating components of a lighting device according to an exemplary embodiment of the present disclosure.

FIG. 17 is a block diagram schematically illustrating elements of a lighting system 1000" according to another exemplary embodiment of the present disclosure. The lighting system 1000" according to the present exemplary embodiment may include a motion sensor 1100, an illumination intensity sensor 1200, a lighting unit 1300, and a controller 1400.

The motion sensor 1100 senses its own motion. For example, the lighting system may be attached to a movable object, such as a container or a vehicle, and the motion sensor 1100 senses a motion of the moving object. When the motion of the object to which the lighting system is attached is sensed, the motion sensor 1100 outputs a signal to the controller 1400 and the lighting system 1000" is activated. The motion sensor 1100 may include an accelerometer, a geomagnetic sensor, or the like.

The illumination intensity sensor 1200, a type of optical sensor, measures an intensity of illumination of a surrounding environment. When the motion sensor 1100 senses the motion of the object to which the lighting system is attached, the illumination intensity sensor 1200 is activated according to a signal output by the controller 1400. The lighting system 1000" can thus illuminate during night work or in a dark environment, for example to call a worker's or an operator's attention to their surroundings, and to allow a driver to secure visibility at night. Thus, even when the motion of the object to which the lighting system is attached is sensed, if an intensity of illumination higher than a predetermined level is sensed (e.g., during the day), illumination by the lighting system 1000" is not required. Also, even in the daytime, if it rains, the intensity of illumination may be fairly low, so there is a need to inform a worker or an operator about a movement of a container, and the light emitting unit may thus nonetheless be configured to emit light. Thus, whether to turn on the lighting unit 1300 is determined by an illumination intensity value measured by the illumination intensity sensor 1200.

The illumination intensity sensor 1200 measures an intensity of illumination of the surrounding environment and outputs the measured value to the controller 1400. Meanwhile, when the illumination intensity value is greater than or equal to a pre-set value, the lighting unit 1300 is not required to emit light, and the illumination provided by the overall system is terminated.

When the illumination intensity value measured by the illumination intensity sensor 1200 is lower than the pre-set value, the lighting unit 1300 emits light. The worker or the operator may notice the light emitted from the lighting unit 1300 and recognize the movement of the container, or the like. As the lighting unit 1300, the foregoing lighting device may be used.

Also, the lighting unit 1300 may adjust an intensity of light emitted therefrom according to the illumination intensity value of the surrounding environment. When the illumination intensity value of the surrounding environment is low, the lighting unit 1300 may increase the intensity of light emitted therefrom, and when the illumination intensity value of the surrounding environment is relatively high, the lighting unit 1300 may decrease the intensity of light emitted therefrom, thus preventing power wastage.

The controller 1400 controls the motion sensor 1100, the illumination intensity sensor 1200, and the lighting unit 1300 overall. When the motion sensor 1100 senses the motion of the object to which the lighting system is attached, and outputs a signal to the controller 1400, the controller 1400 outputs an operation signal to the illumination intensity sensor 1200. The controller 1400 receives an illumination intensity value measured by the illumination intensity sensor 1200 and determines whether to turn on the lighting unit 1300.

Figure 18:
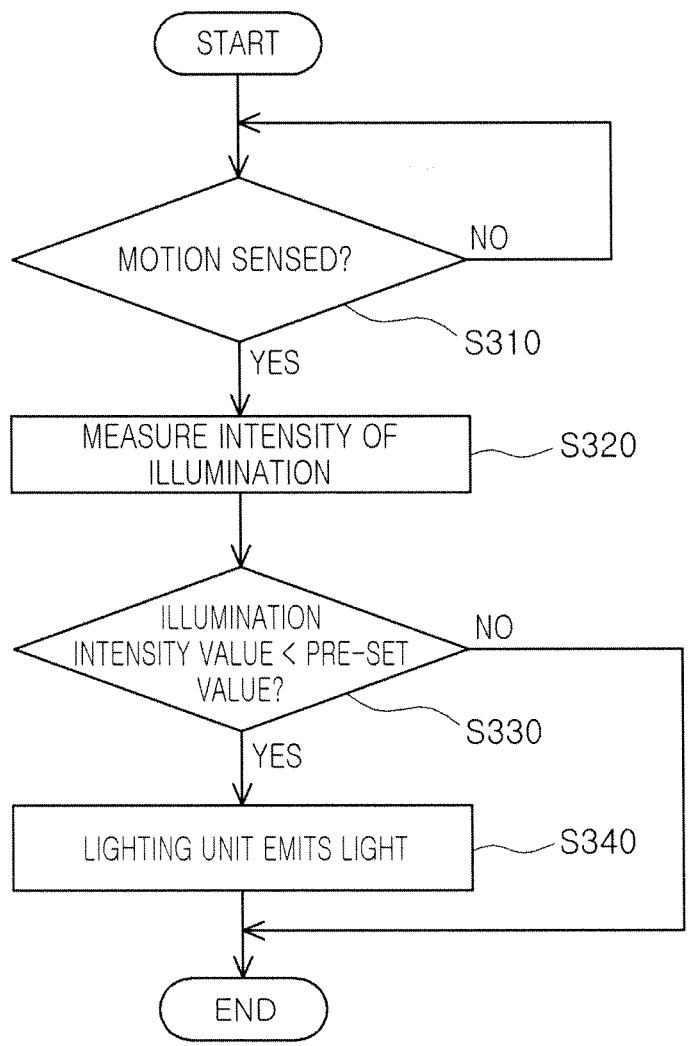
FIGS. 18 through 20 are flow charts illustrating a method for controlling a lighting device illustrated in FIG. 17.

FIG. 18 is a flowchart illustrating a method of controlling a lighting system such as lighting system 1000". Hereinafter, a method of controlling a lighting system will be described with reference to FIG. 18.

First, a motion of an object to which the lighting system is attached is sensed and an operation signal is output (S310). For example, the motion sensor 1100 may sense a motion of a container or a vehicle in which the lighting system is installed, and when the motion of the container or the vehicle is sensed, the motion sensor 1100 outputs an operation signal. The operation signal may be considered a signal for activating overall power of the lighting system. When the motion of the container or the vehicle is sensed, the motion sensor 1100 outputs the operation signal to the controller 1400.

Next, based on the operation signal, an intensity of illumination of a surrounding environment is measured and an illumination intensity value is output (S320). When the operation signal is transmitted to the controller 1400, the controller 1400 outputs a signal to the illumination intensity sensor 1200, and the illumination intensity sensor 1200 measures the intensity of illumination of the surrounding environment. The illumination intensity sensor 1200 then outputs the measured illumination intensity value of the surrounding environment to the controller 1400. Thereafter, whether to turn on the light emitting unit is determined according to the illumination intensity value and the light emitting unit emits light according to the determination.

First, the illumination intensity value is compared with a pre-set value for a determination (S330). When the illumination intensity value is input to the controller 1400, the controller 1400 compares the received illumination intensity value with a stored pre-set value and determines whether the received value is lower than the pre-set value. Here, the pre-set value is a value for determining whether to turn on the lighting unit 1300. For example, the pre-set value may be an illumination intensity value at which a worker or a driver may have difficulty recognizing an object with naked eyes or may make a mistake, such as when the sun starts to set.

When the illumination intensity value measured by the illumination intensity sensor 1200 is greater than the pre-set value, lighting of the lighting unit is not required, so the controller 1400 shuts down the overall system.

Meanwhile, when the illumination intensity value measured by the illumination intensity sensor 1200 is smaller than the pre-set value, lighting of the lighting unit is required, so the controller 1400 outputs a signal to the lighting unit 1300 and the lighting unit 1300 emits light (S340).

Figure 19:
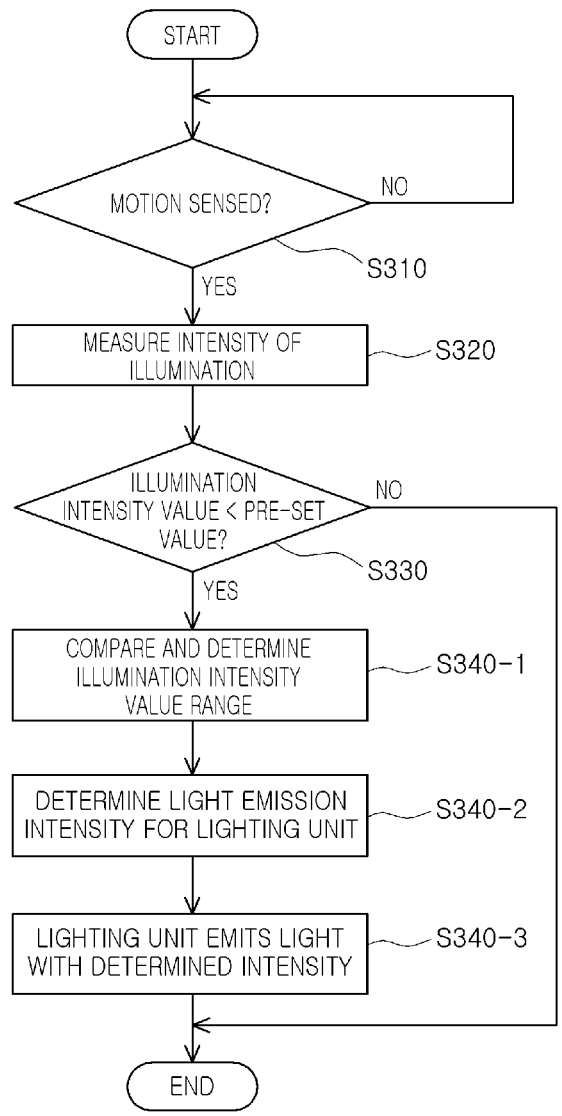

FIG. 19 is a flowchart illustrating a method of controlling a lighting system according to another exemplary embodiment of the present disclosure. Hereinafter, a method of controlling a lighting system (e.g., lighting system 1000") according to another exemplary embodiment of the present disclosure will be described. However, descriptions of steps of the method that are analogous to steps of the method of controlling a lighting system as described above with reference to FIG. 18 will be omitted, and reference can be made to the description of the corresponding steps of FIG. 18.

As illustrated in FIG. 19, according to the present exemplary embodiment, an intensity of light emitted from the light emitting unit may be regulated according to an illumination intensity value of a surrounding environment.

As described above, the illumination intensity sensor 1200 outputs an illumination intensity value to the controller 1400 (S320). When the illumination intensity value is smaller than a pre-set value (S330), the controller 1400 determines one range among a plurality of illumination intensity value ranges which includes the illumination intensity value (S340-1). The controller 1400 has a plurality of illumination intensity value ranges that subdivide the range of illumination intensity values smaller than the pre-set value, and the controller 1400 determines the range including the measured illumination intensity value based on the plurality of ranges.

Next, when the range which includes the measured illumination intensity value is determined, the controller 1400 determines an intensity of light-to-be-emitted that is associated with the determined range (S340-2), and accordingly controls the lighting unit 1300 to emit light having the determined intensity of light-to-be-emitted (S340-3). The intensity of light emitted from the lighting unit 1300 may be determined according to the measured illumination intensity value, and the measured illumination intensity value varies according to weather, time, and the surrounding environment, so the intensity of light emitted from the light emitting unit may also be regulated. By regulating the intensity of light emitted according to the range of the illumination intensity values, power wastage may be prevented and a worker's or an operator's attention may be appropriately drawn to their surroundings.

Figure 20:
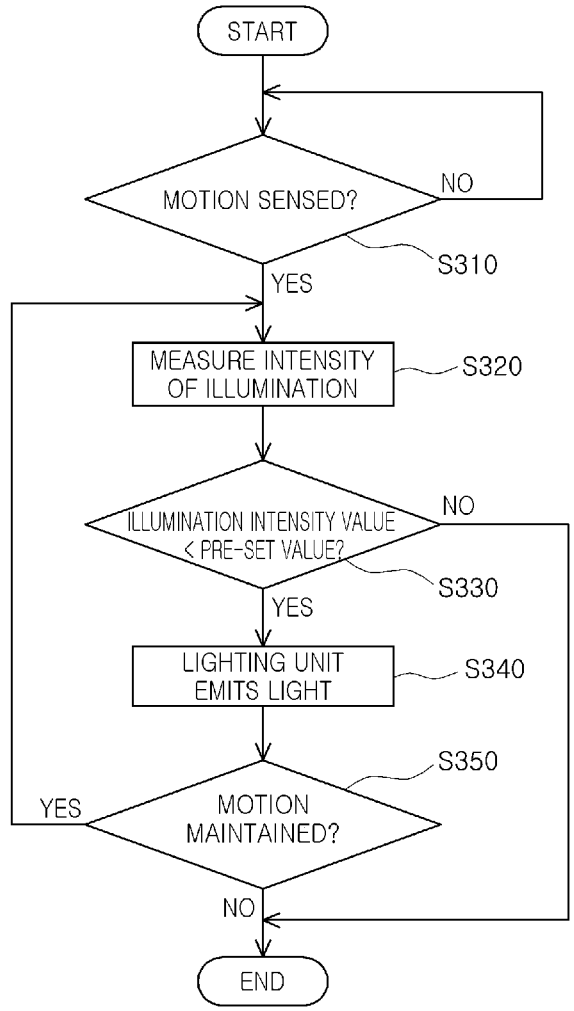

FIG. 20 is a flowchart illustrating a method of controlling a lighting system according to another exemplary embodiment of the present disclosure. Hereinafter, a method of controlling a lighting system (e.g., lighting system 1000") according to another exemplary embodiment of the present disclosure will be described. However, descriptions of steps of the method that are analogous to steps of the methods of controlling a lighting system as described above with reference to FIGS. 18 and 19 will be omitted, and reference can be made to the description of the corresponding steps of FIGS. 18 and 19.

The method of controlling a lighting system according to the present exemplary embodiment further includes operation S350 of determining whether a motion of an object to which the lighting system is attached is maintained while the lighting unit 1300 emits light, and determining whether to maintain light emissions.

When the lighting unit 1300 starts to emit light, termination of the light emissions may be determined based on whether a container or a vehicle to which the lighting system is installed continues to move. Here, when the motion of the container is stopped, it may be determined that operation of the lighting unit can be terminated (step S350, "No"). In addition, when a vehicle temporarily stops at a crosswalk, light emissions of the lighting unit 1300 may be stopped to prevent interference with the vision of oncoming drivers.

When the container or the vehicle moves again, the motion sensor 1100 operates and the lighting unit 1300 may start emitting light once again.

Whether to maintain light emissions may be determined based on whether a motion of an object to which the lighting system is attached is sensed by the motion sensor 1100. When the motion of the object is continuously sensed by the motion sensor 1100 (step S350, "Yes"), an intensity of illumination is measured again (e.g., in step S320) and whether to maintain light emissions is determined. When the motion of the object is not sensed (step S350, "No"), the system can terminate the emission of light.

A lighting device according to an exemplary embodiment of the present disclosure will be described with reference to FIGS. 21 to 23.

Figure 21:
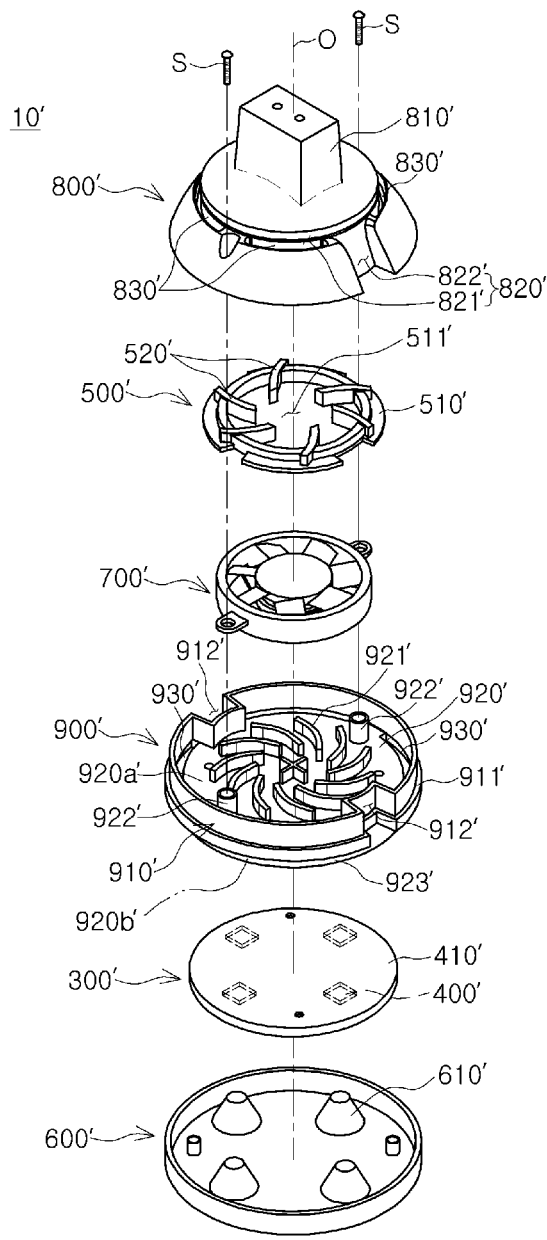
FIGS. 21 through 23 are views illustrating structures of a lighting device according to an exemplary embodiment of the present disclosure.
Figure 22:
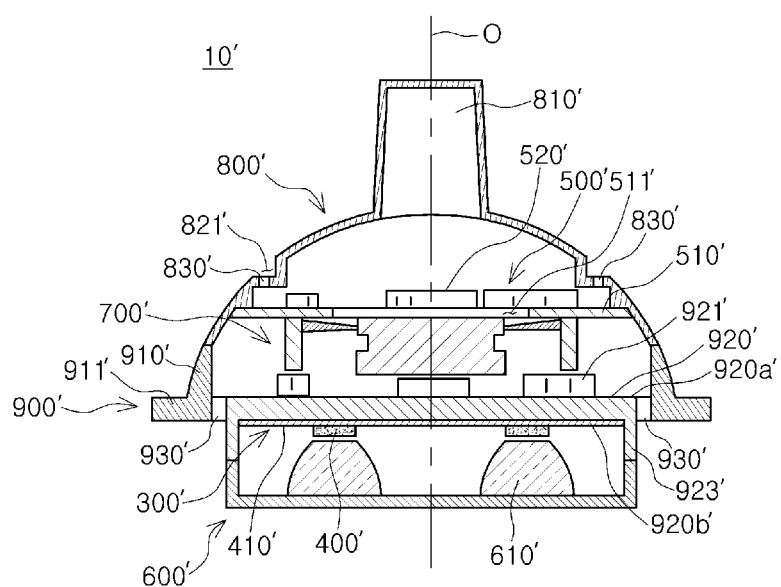

FIG. 21 is an exploded perspective view schematically illustrating a lighting device according to an exemplary embodiment of the present disclosure, and FIG. 22 is a cross-sectional view schematically illustrating a lighting device according to an exemplary embodiment of the present disclosure. In FIGS. 21 and 22, a lamp according to the MR16 standard is illustrated as a lighting device according to the present exemplary embodiment, but the lighting device according to an exemplary embodiment of the present disclosure is not limited thereto.

Referring to FIGS. 21 and 22, a lighting device 10' according to the present exemplary embodiment may include a base 900', a housing 800', a cooling fan 700', and a light emitting unit 600'.

The base 900' is a type of a frame member in which the cooling fan 700' and the light emitting unit 600' are fixedly installed. The base 900' may include a fastening rim 910' and a support plate 920' provided within the fastening rim 910'.

The fastening rim 910' may have an annular structure perpendicular with respect to a central axis O, and have a flange portion 911' protruded from a lower end portion thereof in an outward direction. When the lighting device 10' is installed in a structure such as a ceiling, the flange portion 911' may be inserted into a hole provided in the ceiling to fix the lighting device 10' in place.

The fastening rim 910' may have a recess 912' formed to be depressed in a direction toward a central portion of the base 900'. The recess 912' may have a shape corresponding to that of a flow path 820' of a housing 800' as described hereinafter, and may be formed in a position corresponding to the flow path 820'. Accordingly, the flow path 820' is formed with the recess 912' in a continued manner, so as to be exposed outwards through a lower portion of the fastening film 910'.

The base 900' employed in the present exemplary embodiment will be described in detail. The support plate 920' may be provided on an inner circumferential surface of the fastening rim 910' and have a horizontal structure perpendicular with respect to the central axis O and may be partially connected to the fastening rim 910'. The support plate 920' may have one surface (or an upper surface) 920a' and the other surface (or a lower surface) 920b' both being flat and opposing each other, and may include a plurality of heat dissipation fins 921' formed on one surface 920a' thereof. The plurality of heat dissipation fins 921' may be arranged radially from the center of the support plate 920' toward the edges thereof. In this case, the plurality of heat dissipation fins 921' may each have a curved shape, and form an overall spiral pattern. In the present exemplary embodiment, it is illustrated that the plurality of heat dissipation fins 921' each having a curved shape are arranged in a spiral manner, but the present disclosure is not limited thereto and the heat dissipation fins 921' may have any other various shapes such as a linear shape and the like.

Fixing portions 922' may protrude to a predetermined height from the one surface 920a'. The fixing portions 922' may have a screw hole formed therein to allow the housing 800' and the cooling fan 700' as described hereafter to be fixed thereto by using fixing units such as screws S, or the like.

The light emitting unit 300' is installed on the other surface 920b' of the support plate 920'. A side wall 923' protruded from the other surface 920b' in a downward direction and having a predetermined height may be provided along the circumference of the edges. A space having a predetermined size may be provided within the side wall 923' to accommodate the light emitting unit 300' therein.

An air discharge hole 930' in the form of a slit may be provided between an outer circumferential surface of the support plate 920' and an internal surface of the fastening rim 910'. The air discharge hole 930' may serve as a passage through which air is released from the one surface 920a' toward the other surface 920b', such that air may not be stagnant in the one surface 920a' and a continuous air flow may be maintained.

The base 900' is directly in contact with the light emitting unit 300' which may function as a heat source, and may be made of a material having excellent heat conductivity in order to perform a heat dissipation function such as that of a heat sink. For example, the base 900' may be formed of a metal, a resin, or the like, having excellent heat conductivity through injection molding, or the like, such that the fastening rim 910' and the support plate 920' are integrated. Also, the fastening rim 910' and the support plate 920' may be manufactured as separate components and assembled. In this case, the support plate 920' may be made of a metal, a resin, or the like, having excellent heat conductivity, and the fastening rim 910' that the user directly grasps in case of an operation such as replacement of a lighting device, or the like, may be made of a material having relatively low heat conductivity in order to prevent damage due to burn.

As illustrated in FIGS. 21 and 22, the housing 800' may be disposed on one side of the base 900'. In detail, the housing 800' is fastened to the fastening rim 910', covering the support plate 920'. The housing 800' may have an upwardly convex parabolic shape, and a terminal portion 810' is provided in an upper end portion of the housing 800' and fastened to an external power source (for example, a socket), and an opening may be formed in a lower end portion thereof and fastened to the base 900'. In particular, the housing 800' may include the flow path 820' as a depressed region forming a step with respect to an external surface of the housing 800' to guide an inflow of air from the outside, and an air inflow hole 830' allowing air guided through the flow path 820' to be introduced to an internal surface.

The air inflow hole 830' may have an annular shape along the circumference of the housing 800' and may be adjacent to an upper end portion of the housing 800'. At least one flow path 820' may have a depressed structure in the form of a recess and be formed on an outer surface of the housing 800'. The flow path 820' may extend upwardly along the outer surface of the housing 800' to communicate with the air inflow hole 830'.

In detail, the flow path 820' may include a first flow path 821' formed along the circumference of the housing 800' in a position corresponding to the air inflow hole 830' to communicate with the air inflow hole 830', and a second flow path 822' extending from the first flow path 821' to a lower end portion of the housing 800' to be opened outwards. The second flow path 822' may be formed with the recess 912' of the fastening rim 910' fastened to the lower end portion of the housing 800' in a continued manner, and may extend to a lower portion of the fastening rim 910' to be opened outwards. Accordingly, ambient air may be introduced along the flow path 820' as a portion of the outer surface of the housing 800' from a lower side of the fastening rim 910' and guided in an upward direction, and may be introduced to an internal space of the housing 800' through the air inflow hole 830'. In the present exemplary embodiment, it is illustrated that a pair of second flow paths 822' are provided facing each other, but the number of the second flow paths 822' and positions thereof may be variously modified.

Figure 23:
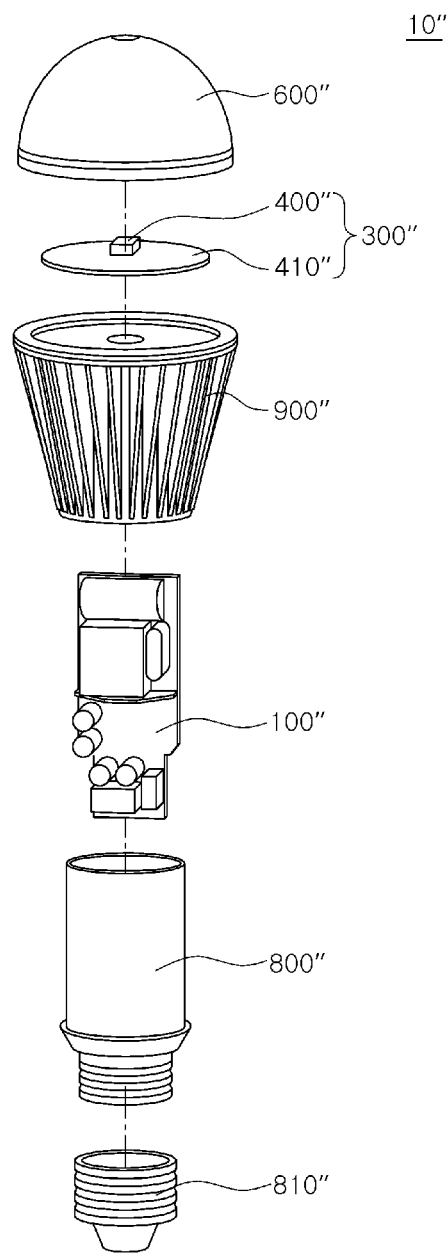

FIG. 23 is an exploded perspective view illustrating a lighting device according to an exemplary embodiment of the present disclosure.

Referring to the exploded perspective view of FIG. 23, a lighting device 10" is illustrated as, for example, a bulb type lamp, including a light emitting unit 300", a lighting driver 100", and an external connection unit 810". Also, the lighting device 10" may further include external structures such as a housing 800" and a cover unit 600". The light emitting unit 300" may include a light emitting device 400" having the LED package structure or any structure similar thereto and a board 410" on which the light emitting device 400" is mounted. In the present exemplary embodiment, a single light emitting device 400" is illustrated as being mounted on the board 410", but the present disclosure is not limited thereto and a plurality of light emitting devices 400" may be mounted as necessary.

Heat generated by the light emitting device 400" may be dissipated through a heat dissipation unit, and a heat sink 900" directly in contact with the light emitting unit 300" to enhance heat dissipation effect may be included in the lighting device 10" according to the present exemplary embodiment. The cover unit 600" may be installed on the light emitting unit 300" and have a convex lens shape. The lighting driver 100" may be installed in the housing 800" and be connected to the external connection unit 810" having a socket structure to receive power from an external power source. Also, the lighting driver 100" may serve to convert received power into an appropriate current source for driving the light emitting device 400" included in the light emitting unit 300" and provide the same. For example, the lighting driver 100" may include a rectifying circuit, a DC-DC converter circuit, and the like.

Also, the lighting device 10" may further include the communications module as described above.

The lighting device using an LED as described above may be altered in terms of an optical design thereof according to a product type, a location, and a purpose. For example, in relation to the foregoing emotional illumination, a technique for controlling lighting by using a wireless (remote) control technique utilizing a portable device such as a smartphone may be provided, in addition to a technique of controlling color, temperature, brightness, and hue of illumination.

In addition, a visible wireless communications technology aimed at simultaneously achieving a unique purpose of an LED light source and a purpose of a communications unit by adding a communications function to LED lighting devices and display devices may be available. This is because an LED light source has a longer lifespan and excellent power efficiency, implements various colors, supports a high switching rate for digital communications, and is available for digital control, in comparison with existing light sources.

The visible light wireless communications technology is a wireless communications technology transferring information wirelessly by using light having a visible light wavelength band recognizable by human eyes. The visible light wireless communications technology for communicating information wirelessly in any of the embodiments described above. The visible light wireless communications technology is distinguished from a wired optical communications technology in that it uses light having a visible light wavelength band and that a communications environment is based on a wireless scheme.

Also, unlike RF wireless communications, the visible light wireless communications technology has excellent convenience and physical security properties as it can be freely used without being regulated or needing permission in the aspect of frequency usage, is differentiated in that a user can physically check a communications link, and above all, the visible light wireless communications technology has features as a fusion technique obtaining both a unique purpose as a light source and a communications function.

As set forth above, according to exemplary embodiments of the present disclosure, the signal converter connected to a management server in a wired manner according to a DALI protocol may communicate with a plurality of lighting drivers that communicate with the management server according to the DALI protocol and drive a plurality of lighting devices, respectively, according to a wireless communication protocol. Thus, a lighting system in which a stable communications connection between the management server and the signal converter is secured and the plurality of lighting devices are wirelessly controlled by converting a signal transmitted and received according to the DALI protocol into a signal conforming to the wireless communication protocol by the signal converter may be provided. In particular, a lighting device may be newly added or a design or operation of an existing lighting device may be simply modified through wireless communication between the signal converter and a lighting device.

Advantages and effects of the present disclosure are not limited to the foregoing content and any other technical effects not mentioned herein may be easily understood by a person skilled in the art from the foregoing description.

While exemplary embodiments have been shown and described above, it will be apparent to those skilled in the art that modifications and variations could be made without departing from the spirit and scope of the present disclosure as defined by the appended claims.

What is claimed is:

1. A lighting system, comprising:
   a digital addressable lighting interface (DALI) master controller connected to a management server;
   a lighting driver configured to operate a lighting device including a light emitting diode (LED); and
   a signal converter connected to the DALI master controller by a DALI bus operating according to a DALI communication protocol, and communicatively connected to the lighting driver via a wireless communication connection operating according to a wireless communication protocol,
   wherein the signal converter inter-converts a signal transmitted to and received from the DALI master controller according to the DALI communication protocol and a signal transmitted to and received from the lighting driver according to the wireless communication protocol so as to enable communication between the lighting driver and the DALI master controller.

2. The lighting system of claim 1, wherein the DALI master controller generates a first signal including information transmitted from the management server and conforming to the DALI communication protocol, and
   the signal converter receives the first signal conforming to the DALI communication protocol, converts the first signal into a second signal conforming to the wireless communication protocol, and transmits the converted second signal to the lighting driver.

3. The lighting system of claim 1, wherein the lighting driver generates a second signal including operation information of the lighting device and conforming to the wireless communication protocol, and
   the signal converter receives the second signal conforming to the wireless communication protocol, converts the second signal into a first signal conforming to the DALI communication protocol, and transmits the converted first signal to the DALI master controller.

4. The lighting system of claim 1, wherein the lighting driver comprises a plurality of lighting drivers, the lighting device comprises a plurality of lighting devices, and each of the plurality of lighting drivers controls operation of at least one of the plurality of lighting devices.

5. The lighting system of claim 4, wherein at least one of the plurality of lighting drivers is integrated in a single module with the signal converter.

6. The lighting system of claim 5, wherein the at least one lighting driver integrated in a single module with the signal converter is communicatively connected to at least one other lighting driver and configured to perform communication according to the wireless communication protocol with the at least one other lighting driver.

7. The lighting system of claim 4, wherein the signal converter communicates independently with each of the plurality of lighting drivers by using unique addresses allotted to each of the plurality of lighting drivers.

8. The lighting system of claim 1, wherein the lighting driver comprises:
   a wireless communications module configured to receive from the signal converter a signal conforming to the wireless communication protocol; and driving circuitry configured to control operation of the lighting device based on information included in the signal received from the signal converter.

9. The lighting system of claim 8, wherein the driving circuitry controls an operation of the lighting device by adjusting duty ratios of one or more switching elements, and
the duty ratios of one or more switching elements are adjusted based on information included in the signal received from the signal converter.

10. The lighting system of claim 1, wherein the signal converter comprises:
a first communications module configured to communicate with the DALI master controller according to the DALI communication protocol;
a second communications module configured to communicate with the lighting driver according to the wireless communication protocol; and
a control module configured to inter-convert a first signal conforming to the DALI communication protocol and a second signal conforming to the wireless communication protocol.

11. The lighting system of claim 10, wherein the control module is a plurality of control modules, and one of the plurality of control modules inter-converts the first and second signals, and
the plurality of control modules are connected to each other to perform communication according to at least one of a serial peripheral interface (SPI), a universal asynchronous receiver transmitter (UART) interface, and an inter-integrated circuit (I2C) interface.

12. The lighting system of claim 11, wherein the plurality of control modules are provided as a single integrated circuit (IC).

13. The lighting system of claim 10, wherein the control module extracts at least one of address information, device information, and control information from a signal received through the first communications module and conforming to the DALI communication protocol to generate a signal conforming to the wireless communication protocol.

14. The lighting system of claim 1, wherein the wireless communication protocol is a protocol based on at least one of ZigBee™, ultra-side band (UWB), wireless local area network (WLAN), Bluetooth™, infrared data association (IrDA), and radio frequency identification (RFID).

15. A signal converting device comprising:
a first communications module configured to communicate with a management server in a wired manner according to a digital addressable lighting interface (DALI) communication protocol;
a second communications module configured to communicate with a plurality of lighting drivers operating a plurality of lighting devices according to a wireless communication protocol; and
a control module configured to inter-convert a first signal transmitted and received by the first communications module and conforming to the DALI communication protocol and a second signal transmitted and received by the second communications module and conforming to the wireless communication protocol,
wherein the control module transmits and receives different second signals to and from each of the plurality of lighting drivers based on information included in the first signal.

16. A lighting system comprising:
a signal converter receiving across a wired interface a first signal for controlling a lighting device and conforming to a wired communication protocol, and converting the first signal into a second signal for controlling the lighting device and conforming to a wireless communication protocol; and
a lighting driver comprising:
a wireless communications module receiving across a wireless interface the second signal for controlling the lighting device from the signal converter; and
a converter providing a driving signal to the lighting device,
wherein the converter controls the driving signal based on the second signal.

17. The lighting system of claim 16, wherein the first and second signals include pulse width modulation (PWM) signal information, and the converter controls a switching element according to the PWM signal information of the second signal in order to adjust a duty ratio of the driving signal provided to the lighting device.

18. The lighting system of claim 16, wherein the signal converter extracts address information conforming to the wired communication protocol from the first signal, and includes in the second signal address information of the lighting driver that conforms to the wireless communication protocol and is determined based on the address information extracted from the first signal.

19. The lighting system of claim 16, wherein the wireless communications module transmits across the wireless interface a third signal including device information from the lighting driver, and
the signal converter receives across the wireless interface the third signal, and converts the third signal into a fourth signal including the device information from the lighting driver and conforming to the wired communication protocol for transmission across the wired interface.

* * * * *